(12) United States Patent
Davoodi et al.

(10) Patent No.: US 8,912,892 B2
(45) Date of Patent: Dec. 16, 2014

(54) AUTONOMOUS AND CONTROLLABLE SYSTEMS OF SENSORS AND METHODS OF USING SUCH SYSTEMS

(71) Applicant: California Institute of Technology, Pasadena, CA (US)

(72) Inventors: Faranak Davoodi, San Marino, CA (US); Neil Murphy, La Crescenta, CA (US); Farhooman Davoudi, Roissy-en-Brie (FR)

(73) Assignee: California Institute of Technology, Pasadena, CA (US)

(*) Notice: Subject to any disclaimer, the term of this patent is extended or adjusted under 35 U.S.C. 154(b) by 67 days.

(21) Appl. No.: 13/776,652

(22) Filed: Feb. 25, 2013

(65) Prior Publication Data

US 2013/0222115 A1 Aug. 29, 2013

Related U.S. Application Data

(60) Provisional application No. 61/602,221, filed on Feb. 23, 2012, provisional application No. 61/662,852, filed on Jun. 21, 2012, provisional application No. 61/727,459, filed on Nov. 16, 2012.

(51) Int. Cl.
*H04Q 5/22* (2006.01)
(52) U.S. Cl.
USPC ..... 340/10.1; 340/10.2; 340/10.6; 340/407.1; 340/447; 381/345; 381/355; 381/360; 381/361

(58) Field of Classification Search
CPC ............... H04Q 2209/25; H04Q 2209/40
USPC ............ 340/10.1, 10.2, 10.6, 407.1, 447; 381/345, 355, 360, 361
See application file for complete search history.

(56) References Cited

U.S. PATENT DOCUMENTS

| 6,289,263 | B1 * | 9/2001 | Mukherjee | 700/245 |
| 6,679,118 | B1 * | 1/2004 | Esashi et al. | 73/514.32 |
| 8,054,198 | B2 * | 11/2011 | Spinelli et al. | 340/870.02 |
| 8,316,970 | B1 * | 11/2012 | Tran | 180/7.1 |
| 2005/0200481 | A1 | 9/2005 | Wallach | |
| 2010/0274488 | A1 | 10/2010 | Kenney et al. | |

FOREIGN PATENT DOCUMENTS

EP 2207013 7/2010

OTHER PUBLICATIONS

PCT International Search Report mailed on Oct. 16, 2013 for PCT/US2013/046656 filed on Jun. 19, 2013 in the name of California Institute of Technology.
PCT Written Opinion mailed on Oct. 16, 2013 for PCT/US2013/046656 filed on Jun. 19, 2013 in the name of California Institute of Technology.
B. Joyce, "Development of an Electromagnetic Energy Harvester for Monitoring Wind Turbine Blades." MS Thesis. Virginia Polytechnic Institute and State University. Dec. 12, 2011. www.scholarlib.vt.edu/theses/available/etd-12202011-195538/unrestricted/Joyce_BS_T_2011.pdf. Retrieved Jul. 2, 2013.

(Continued)

*Primary Examiner* — Tai T Nguyen
(74) *Attorney, Agent, or Firm* — Steinfl & Bruno, LLP

(57) ABSTRACT

An autonomous and controllable system of sensors and methods for using such a system of sensors are described.

54 Claims, 18 Drawing Sheets

(56) References Cited

OTHER PUBLICATIONS

Kume, H. "Fujifilm Shows High-efficiency—Thermoelectric Converter Using Organic Material." www.techon.nikkeibp.co.jp/english/NEWS_EN/20130206/264517/. Retrieved Jul. 2, 2013.

K. Najafi, et al. "Microsystems for Energy Harvesting," Invited Paper, 16th International Conference on Solid-State Sensors, Actuators, and Microsystems (IEEE Transducers), Beijing China, pp. 1845-1850, Jun. 2011.

"Waspmote Datasheet" www.libelium.com/documentation/waspmote/waspmote-datasheet_eng.pdf. Retrieved Jul. 2, 2013.

Repas, R. Sensor Sense: Metal-faced inductive sensors for Durability. Machine Design. Nov. 6, 2012. www.machinedesign.com/article/metal-faced-inductive-sensors-for-durability-1106. Retrieved Jul. 2, 2013.

"Remote Explosives Detection" www.gs.flir.com/products/icx-detection/explosives/fido-onboard/. Retrieved Jul. 2, 2013.

www.Synkera.com. Retrieved Jul. 2, 2013.

www.vectornay.com. Retrieved Jul. 2, 2013.

"TES and Cosmic Microwave Background Detection" www.microdevices.jpl.nasa.gov/capabilities/superconducting-devices/tes-bolometers.php. Retrieved Jul. 2, 2013.

Norford, L. et al. "Piezoelectric MEMS airflow sensor for wind velocity and direction measurement" www.pdfdownload.org/pdf2html/view_online.php?url=http%3A%2F%2Fcensam.mit.edu%2Fnews%2Fposters%2F2010%2Fnorford%2F4.pdf. Retrieved Jul. 2, 2013.

Persaud, R. "LEACH Protocol for Wireless Sensor Networks". www.cs.gsu.edu/yil/teaching/Fall10/sensor/Slides/rp.pdf. Retrieved Jul. 2, 2013.

Oh, Y.S. et al. "Use of microorganism-immobilized polyurethane foams to absorb and degrade oil on water surface." www.ncbi.nlm.nih.gov/pubmed/11030581. Retrieved Jul. 2, 2013.

"Gamma Spectroscopy" www.ortec-online.com/Solutions/gamma-spectroscopy.aspx. Retrieved Jul. 2, 2013.

Nuñez, J. I. et al. "The Multispectral Microscopic Imager (MMI) with Improved Spectral Range and Resolution" $40^{th}$ Lunar and Planetary Science Conference. 2009.

Gellert, R. "Alpha Particle X-ray Spectrometer (APXS)" www.msl-scicorner.jpl.nasa.gov/Instruments/APXS/. Retrieved Jul. 2, 2013.

Jet Propulsion Laboratory Microdevices Laboratory. 2009 Annual Report. www.instrumentsystems.jpl.nasa.gov/docs/MDL_AR09_041310.pdf. Retrieved Jul. 2, 2013.

Sinha, M.P. et al. "Laser ablation-miniature mass spectrometer for elemental and isotopic analysis of rocks" Review of Scientific Instruments. Sep.. 2011. 82(9).

"The World's Largest Desert". www.geology.com/records/largest-desert.shtml. Retrieved Jul. 2, 2013.

Harrington, P. et al, "Relationship between Reservoir Quality and Hydrocarbon Signatures Measured at the Surface" Search and Discovery Article #41078 (2012). Posted Nov. 26, 2012.

"Sensor Boards" www.libelium.com/products/waspmote/sensors. Retrieved Jul. 2, 2013.

"iShake" www.ishakeberkeley.appspot.com/. Retrieved Jul. 2, 2013.

Tadesse, Y. et al. "Hydrogen-fuel-powered bell segments of biomimetic jellyfish" Smart Mater. Struct. 21 (2012) 045013 (17pp).

* cited by examiner

AUTONOMOUS AND CONTROLLABLE SYSTEMS OF SENSORS AND METHODS OF USING SUCH SYSTEMS

CROSS REFERENCE TO RELATED APPLICATIONS

This application claims priority to U.S. provisional application No. 61/602,221 filed on Feb. 23, 2012, U.S. provisional application No. 61/662,852 filed on Jun. 21, 2012 and U.S. provisional application No. 61/727,459 filed on Nov. 16, 2012, all three of which are incorporated herein by reference in their entirety.

STATEMENT OF FEDERAL GRANT

The invention described herein was made in the performance of work under a NASA contract, and is subject to the provisions of Public Law 96-517 (35 USC 202) in which the Contractor has elected to retain title.

FIELD

The present disclosure relates to sensory systems. More in particular, it relates to autonomous and controllable systems of sensors and methods of using such systems.

SUMMARY

According to an aspect of the disclosure, a sensor system is provided. The sensor system comprises a plurality of unit sensors, each unit sensor comprising: an inner enclosure; an outer enclosure enclosing the inner enclosure, the outer enclosure including at least one sensing device and a controlling device; and a first elastic layer between an outer surface of the inner enclosure and an inner surface of the outer enclosure, wherein each unit sensor is configured to communicate with other unit sensors within the sensor system; and the plurality of unit sensors in the sensor system form a network of sensors. Methods of using the sensor system are also provided in the disclosure.

BRIEF DESCRIPTION OF THE FIGURES

The accompanying drawings, which are incorporated into and constitute a part of this specification, illustrate one or more embodiments of the present disclosure and, together with the description of example embodiments, serve to explain the principles and implementations of the disclosure.

DETAILED DESCRIPTION

Figure 1A:
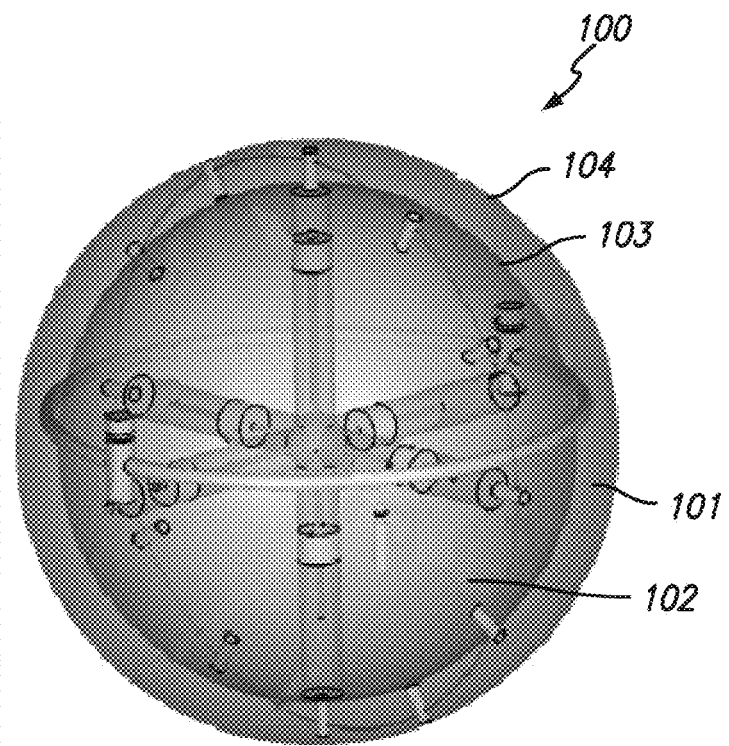
FIG. 1A shows a three-dimensional view of the internal structure of a spherical mobile sensor in an inflated state.

Throughout the present disclosure, embodiments and variations are described for the purpose of illustrating uses and implementations of the inventive concept. The illustrative description should be understood as presenting examples of the inventive concept, rather than as limiting the scope of the concept as disclosed herein. Like reference numerals indicate corresponding parts in various figures.

In the present disclosure, the term "sensing device" can be used to refer to a device used for measuring a physical quantity. Some examples of a sensing device is: gamma spectrometer, multispectral microscopic imager, alpha particle X-ray spectrometer, Raman spectrometer with a VLOK microchip laser integrated within a Raman probe-head, miniature mass spectrometer (MMS), MEMS gas chromatography sensors, different MEMs gas detectors, etc.

In the present disclosure, the term "controlling device" can be used to refer to a device used for controlling the movement and communication of a structure, where the structure can comprise various sensing devices.

According to an example embodiment of the present disclosure, FIG. 1A shows a three-dimensional view of the internal structure of a spherical mobile sensor (100) in an inflated state. Depending on the application in which the spherical mobile sensor (100) is to be deployed, the spherical mobile sensor (100) can have oval, cylindrical or other three-dimensional shapes as well. The spherical mobile sensor (100) can be in an un-inflated or foldable state as well (for example, during deployment of the spherical mobile sensor from a launching vehicle), depending on the application. Having a spherical structure can help the mobile sensor (100) act as a three-dimensional wheel that can easily be moved by an internal or external drive in any possible direction. In addition, the spherical mobile sensor (100) can be deployed in nature or in indoor areas where ambient forces such as wind, sea-currents, solar rays, and down-rolling gravity could be present. By utilizing such ambient forces alone or in combination with internal power sources of the mobile sensor (100), the spherical mobile sensor (100) can save more energy.

As illustrated in the example embodiment of FIG. 1A, the spherical mobile sensor (100) can be comprised of two sublayers: an outer layer (101) and an inner layer (102), where the two sublayers (101) and (102) are separated from each other by a skin (103) that is generally thin. The skin (103) will be referred to as an "inner skin" throughout the present disclosure. A thin skin (104), referred to as an "outer skin" throughout the present disclosure, can entirely cover the outer layer (101) of the spherical sensor (100) in order to ensure the spherical shape of the sensor (100) when the sensor (100) is deflated. When deflated, the outer skin (104) could act like a plastic bag holding the inner layer (102), inner skin (103) and the outer layer (101) of the spherical mobile sensor (100). The outer layer (101) of the spherical mobile sensor (100) can extend from an inner side of the outer skin (104) to an outer side of the inner skin (101) of the spherical mobile sensor (100). The inner side being the side of the outer skin (104) located at the outer layer (101) of the mobile sensor (100). The outer side being the side of the inner skin (103) located at the outer layer (101) of the mobile sensor (100). The inner skin (103) of the spherical sensor (100) can completely enclose the inner layer (102) of the spherical sensor.

Figure 1B:
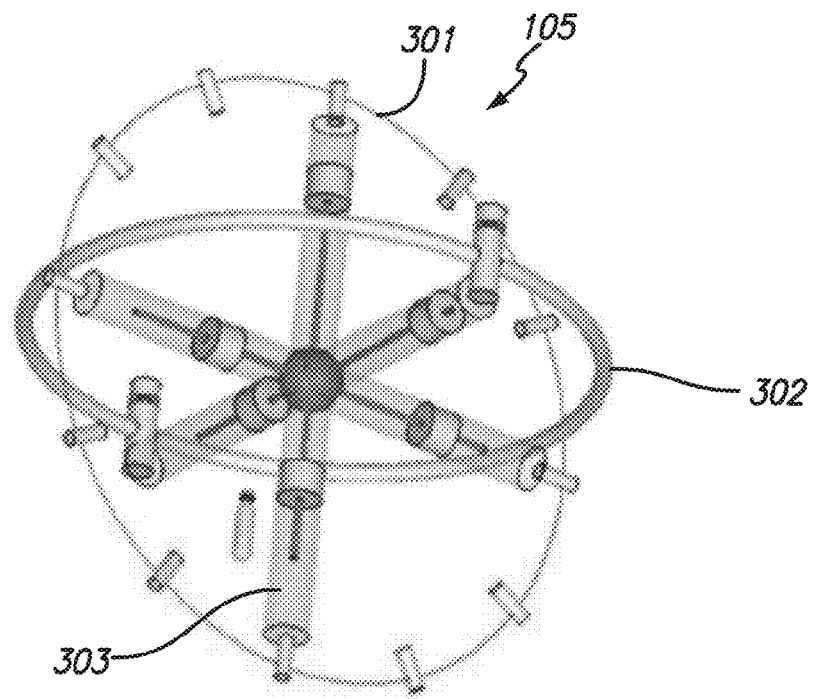
FIG. 1B shows the internal skeleton of the spherical mobile sensor.

In accordance with the present disclosure, FIG. 1B shows the internal skeleton (105) of the spherical mobile sensor (100) without any outer skin (104) and inner skin (103). Different components of the internal skeleton (105) are discussed in later sections of this disclosure.

Figure 2:
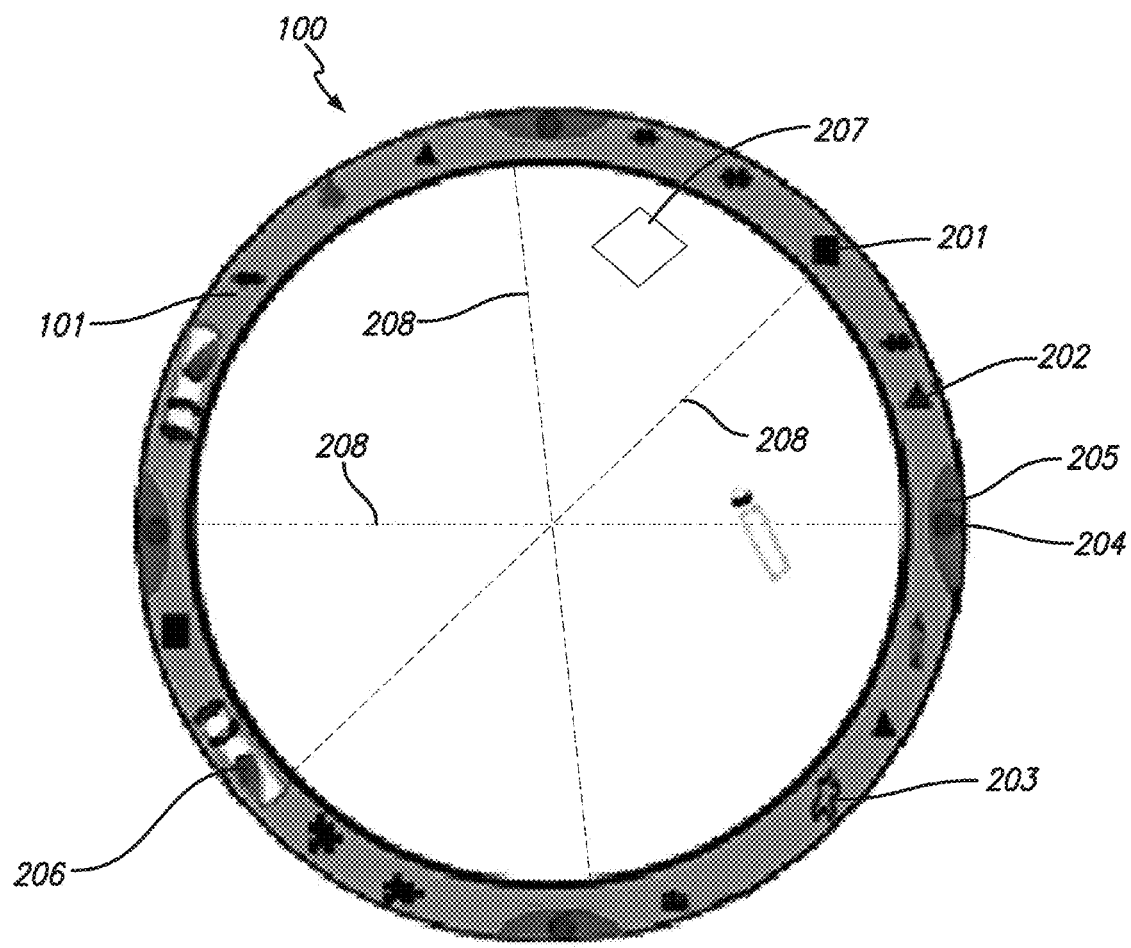
FIG. 2 shows the spherical mobile sensor in an inflated state without any components in the inner layer except one or more protective spokes and diffuser capsule.

According to an example embodiment of the present disclosure, FIG. 2 shows the spherical mobile sensor (100) in an inflated state without any components in the inner layer (102), except one or more protective spokes (208). The outer layer (101) of the spherical mobile sensor (100) in the inflated state can be filled with, for example, elastomer polymer (e.g. polyurethane or metallic micro-lattices aerogel). The outer layer (101) can comprise one or more temperature and mass sensors (201), micro-processors (202), micro-transceivers (203), imagers (204) surrounded by a liquid or gel (205), and one or more disseminator canisters (206). The one or more disseminator canisters (206) can use, for example, a NASA standard initiator (NSI) or other pyrotechnic tools to trigger or break caps of the one or more disseminator canisters (206) in order to release its content. The protective spokes (208) can help the spherical sensor to maintain its spherical shape. The protective spokes (208) can be used as antennas as well.

In order to make the outer layer (101) water, temperature, tensile and puncture resistant, the outer layer (101) can be coated with, for example, polyurea resin. The various components (201, 202, 203, 204, 205 and 206) of the outer layer (101) of the spherical mobile sensor (100) can be embedded in the elastomer polymer (for example, any polyurethane, e.g. TRYMER® 1800 or metallic micro-lattices) inside the outer layer (101). The metallic micro-lattices elastomers can have a very low density as well as efficient shock absorbing capacity. Additionally, the metallic micro-lattices elastomer can be able to completely recover their shape after significant compression. On the other hand, rubbery polyurea based aerogel, which is heavy but sturdy, can be used to fill the outer layer (101) as well for some applications, for example, spherical sensors (100) deployed in an extremely windy locations such as the Antarctica. Moreover, the protective elastomers inside the outer layer (101) can help the spherical mobile sensor (100) to be bouncy or elastic and can improve the spherical mobile sensor's (100) agility and movement. Therefore, the elastic and bouncy spherical mobile sensor (100) can be agile, can rebound from impact with an obstacle and can be salted by wind in order to pass through cluttered surfaces without using a significant amount of energy.

As shown in the example embodiment of FIG. 2, the sensors (201), micro-processors (202), micro-transceivers (203) etc., embedded inside the outer layer (101) of the spherical mobile sensor (100), can be used for various sensing and data collecting activities. Some examples of such sensors are: MEMS (micro electro mechanical system), CMOS panoramic imager, Gamma spectrometers, multispectral microscopic imager, Raman spectrometer with a VLOK microchip laser integrated within a Raman probe-head, miniature mass spectrometer (MMS), MEMS gas chromatography sensors, different MEMs gas detectors, alpha particle X-ray spectrometer, Raman spectrometer, camera on A chip DigiKey OVM7690-R20A, dino-lite digital microscope, ocean optics USB2000 spectrometer, micro-weather station etc. More example sensors can be found in references [4]-[20], incorporated herein by reference in its entirety. The imager (204) integrated at the outer layer (101) can use, for example, technology similar to that of a liquid compass in order to hold the imager's (204) lens (not shown) in a stabilize position, when rest of the spherical mobile sensor's (100) structure is rolling. The imagers (204) can be surrounded by a liquid or gel (205) in order to stabilize the lens of the imager (204). The imagers (204) could be protected by sapphire or protective transparent elastomers.

The outer layer (101) of the spherical mobile sensor (100) can further comprise one or more energy harvesting materials and tools (207) to charge one or more internal sources of power (e.g. a battery, a capacitor etc.) of the spherical mobile sensor (100). The vibration caused by the movement of the spherical mobile sensor's (100) elastic structure, can be used to harvest energy and the harvested energy can be used to charge the battery. Several small, lightweight and rechargeable polymer lithium ion batteries or rechargeable thin film lithium ion batteries could be placed inside the outer layer (101) or on the inner skin (103) of the spherical sensor (100). Some special polymers, for example, triboelectric (which can generate or produce electricity by harnessing friction between surfaces) or self-charging power cell (SCPC) (which can harvest mechanical energy more efficiently than systems using separate generators and batteries) can be embedded inside the outer layer (101) as well, in order to generate power by harvesting the vibration and motion of the spherical mobile sensor (100).

Figure 3:
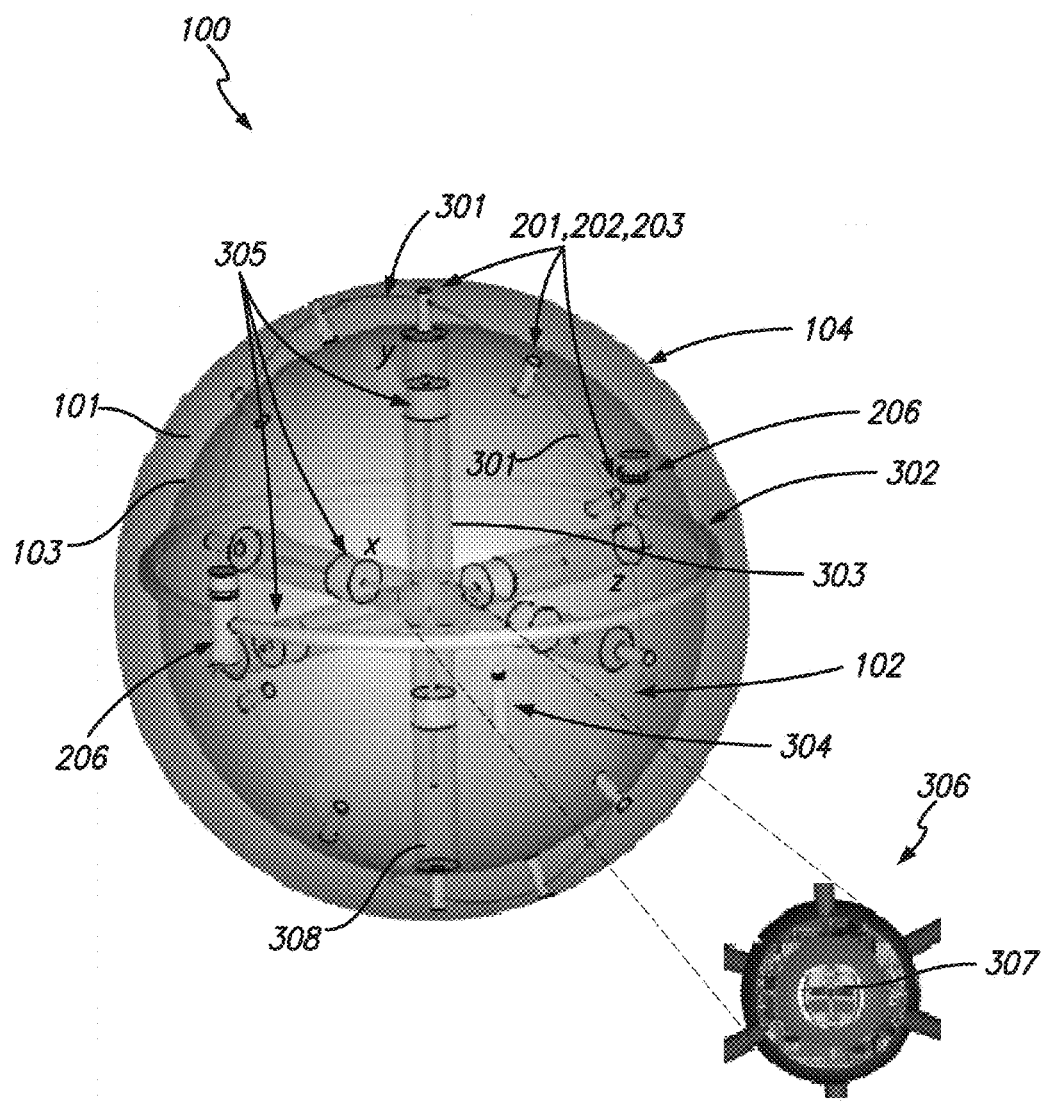
FIG. 3 shows a perspective view of the internal layered structure of an inflated spherical mobile sensor.
Figure 4:
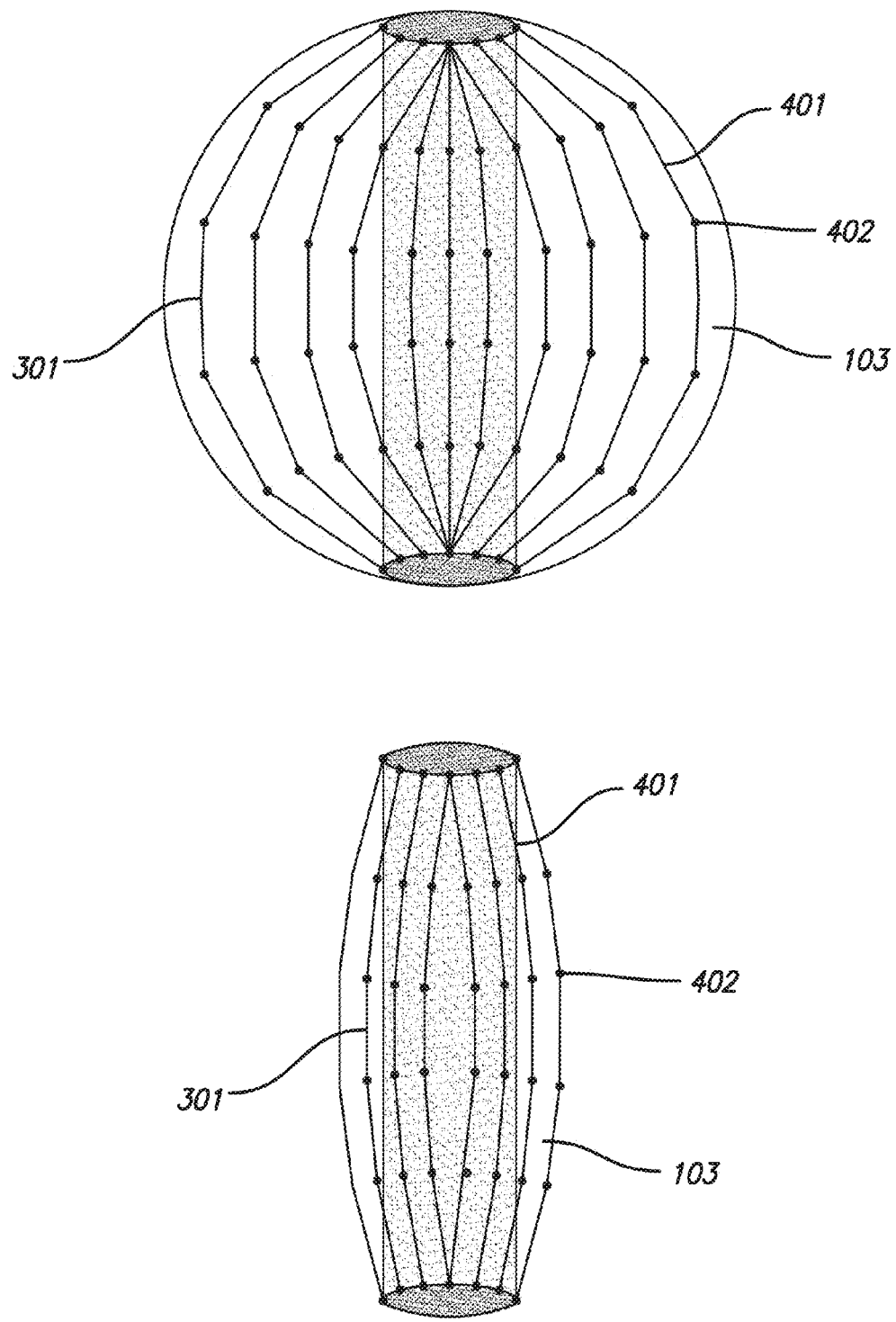
FIG. 4 shows the structure of the tightening rings inside the spherical mobile sensor.

According to another example embodiment of the present disclosure, FIG. 3 shows a perspective view of the internal layered structure of an inflated spherical mobile sensor (100). As illustrated in FIG. 3, the outer layer (101) of the spherical mobile sensor (100) further comprises one or more rigidizable tightening rings (301) (only one tightening ring is shown in FIG. 3) encircling the inner layer (102) of the spherical mobile sensor (100) at different angles. The tightening rings (301) can be used to hold the spherical mobile sensor (100) structure tightly together. Additionally, the tightening rings (301) can be used to rigidize and inflate the structure of the inner layer (102) as shown in FIG. 4. The tightening rings (301) can be made of, for example, aluminum, titanium or carbon fiber. As shown in FIG. 4, the tightening rings (301) can be comprised of a plurality of strands (401) connected to each other through flexible mechanical joints (402), similar to the strings in an umbrella. The tightening rings (301) can be laminated on the outer side of the inner skin (103). Moreover, as mentioned previously, if in some applications stronger structure of a spherical sensor (100) is desired, multiple thin films (403) of aluminum or carbon-fiber could be laminated inside the polymeric inner skin (103) in order to make the inner skin harder when desired.

With reference back to FIG. 3, the sensors (201) and the micro-devices (for example, micro-processors (202), micro-transceivers (203), etc.) situated at the outer layer (101) of the spherical mobile sensor (100) can be symmetrically distributed around the tightening rings (301) and the spherical mobile sensor (100) structure based on their weights in order to keep the entire spherical mobile sensor (100) structure balanced. The tightening rings (301) can also function as an antenna for the spherical mobile sensor's (100) communication system. The wires and cables used for transferring electricity and data between the various sensors, electronics, and micro-devices in different parts of the spherical mobile sensor (100) can be attached around the tightening rings (301) as well, in order to stay protected and intact while adding strength to the tightening rings (301) and therefore to the structure of the spherical mobile sensor (100).

For certain applications, for example, if the spherical mobile sensor (100) needs to carry and dispense some materials (e.g. chemical materials or bacteria) in some specific areas, the spherical mobile sensor (100) can incorporate one or more tubular rings (302) with attached one or more disseminator canisters (206) at the outer layer (101), as shown in FIG. 3. The one or more tubular rings (302) situated at the outer layer (101) of the spherical mobile sensor (100), encircles the inner layer (102) of the spherical mobile sensor (100) as well. The numbers and sizes of the tubular rings (302) present inside a spherical sensor (100), as well as the numbers and sizes of one or more disseminator canisters (206) connected to it can vary depending on size, mass and application of the spherical mobile sensor (100). The one or more tubular rings (302) could be made of, for example, ETFE covered by polyurea resin. ETFE has a very high melting temperature, and good chemical and electrical resistance properties. The tubular ring (302) made of ETFE and covered by polyurea resin, can become tensile resistant as well. Examples of other applications where the spherical mobile sensor (100) may require to carry certain chemicals or bacteria in an area of interest, can be, for example, surface of the sea to clean up an oil spillage using some cleaning up chemicals or bacteria. For applications like this, the one or more tubular rings (302) and the one or more disseminator canisters (206) can contain the chemicals and the bacteria that are required to be spread over an area of interest.

In accordance with the present disclosure, the example embodiment of FIG. 3 further illustrates different components of the inner layer (102) of the spherical mobile sensor (100). As previously indicated, the inner skin (103) separates the inner layer (102) of the spherical mobile sensor (100) from its outer layer (101). A plurality of the sensors (for example, 201, 202, 203, 204, 205 and 206) and other electronic circuitries can be printed or laminated on the outer side of the inner skin (103) of the sensor (100). The inner skin (103) of the spherical mobile sensor (100) can be made of printable circuitry suitable materials, for example, BoPET (Biaxially-oriented polyethylene terephthalate), nanowires (highly conductive and elastic conductors made from silver nanoscale wires), kapton, ETFE (ethylene tetra fluoro ethylene) or kevlar in combination with carbon nanotubes, in order to provide high tensile-resistance and high strength to the inner skin (103) over a wide temperature range. Due to this quality of high tensile-resistance and high strength, the inner skin (103) of the spherical mobile sensor (100) can be imprinted with variety of electronic circuits, batteries, capacitors, sensors, solar cells, antenna, and thereby saving mass and space for the spherical mobile sensor (100), relative to a case where such components are not imprinted on the inner skin (103). The lighter weight can help the sensor (100) to move easily as well. Additionally, the materials (for example, kapton, ETFE or kevlar in combination with carbon nanotubes) used for the inner skin (103) can remain stable for temperature differences ranging from −100 to +100° C., which can prevent the decay of the spherical mobile sensor (100) if deployed in harsh environments, for example, the Arctic, Antarctic, deserts, deep-seas, etc. Moreover, if in some applications stronger structure of a spherical sensor (100) is desired, multiple thin films of aluminum or carbon-fiber could be laminated inside the polymeric inner skin (103) in order to make it harder when desired.

According to the example embodiment of FIG. 3, the inner layer (102) of the spherical mobile sensor (100) can be comprised of a control mechanism (303) and one or more diffuser capsules (304) (only one capsule is shown in FIG. 3). The one or more diffuser capsules (304) inside the inner layer (102) of the spherical mobile sensor (100) can be used to carry solid or liquid nitrogen in a compact form and can use, for example, a NASA Standard Initiator (NSI), or any other pyrotechnic tool, with a solid propellant in order to trigger and explode the capsule's cap to open and diffuse the nitrogen gas when necessary. Additionally, the one or more diffuser capsules (304) can contain some strengthening rigidizable waxes such as polyurea glue to spray and cover an inner side of the inner skin (103) of the spherical mobile sensor (100). The inner side being the side of the inner skin (103) located at the inner layer of the mobile sensor (100). This can help to maintain the spherical shape of the spherical mobile sensor (100) for a long time and can make it water, temperature, tensile, and puncture resistant. There could be a low mass and low power pressure sensors, for example, the thin film pressure sensor [19] laminated inside the inner skin (103) to ensure the inner pressure of the inner layer (102) is as desired.

According to an example embodiment of the present disclosure, FIG. 3 illustrates the control mechanism (303) of the spherical mobile sensor (100), which can comprise at least three equal length principle axles ("X", "Y" and "Z") orthogonally connected to each other at their center, where each axle is surrounded by a light weight tube (308). Each tube (308) surrounding the axles can be made of, for example, ETFE, or a particular polymer or a composition of more than one polymer, in order to keep the tube light weight. Additionally, the length of each tube (308) can be more than the length of the axle, where each tube (308) can extend up to the inner skin (103) of the spherical mobile sensor (100) in either direction from their corresponding center. The control mechanism (303) of the spherical mobile sensor (100) can further comprise at least six movable equal weights (305). For example, the control mechanism (303) can include two weights in each axle to balance and adjust the motion of the spherical mobile sensor (100). The light weight tubes (308) surrounding each axle can keep the movable weights (305) secure and can prevent the movable weights (305) from hurting the structure of the spherical mobile sensor (100), for example, if the axles get broken while the spherical mobile sensor (100) is in the field. Each weight from the pair of weights in each axel can be separated from each other by a blocking structure (306) located at the junction of the three axles, where the blocking structure (306) can prevent the weights from passing through the center of each axle. The level of freedom for each weight can be from the inner skin (103) of the spherical mobile sensor (100) to the center of the spherical mobile sensor (100) and vice versa. When the movable weights are in a centrally-symmetric position, the blocking structure (306) can act as a center of mass for the spherical mobile sensor (100) and can help in the spherical mobile sensor's (100) movement by an internal or external force such as wind. Alternatively, the movable weights can control the mobile sensor's (100) motion by changing the center of mass of the structure. In the absence of an external force, the movable weights can set the mobile sensor in motion by appropriately moving in the axles and therefore, creating a torque. The axles ("X", "Y" and "Z") can be used as, for example, dipole antennas as well, in order to save mass and space for the spherical mobile sensor (100).

A controller (307) situated inside the blocking structure (306) can control the position of the weights and therefore the spherical mobile sensor's (100) movements by controlling the movements of the corresponding axle using the controller's (307) motor (not shown in FIG. 3) and a desired algorithm uploaded in the controller's (307) processor. The positioning of the weights can aid in movement of the mobile sensor (100). By way of example and not of limitation, the controller (307) can be in charge of computations, positioning sensors, controlling algorithms, and actuating. Some part of the controlling tasks, such as computations could be done, for example, in a remote control device or in a computer outside the spherical mobile sensor (100). Moreover, instruments such as a gyroscope or an accelerometer can be utilized to help the controller (307) to recognize the orientation and the direction of the spherical mobile sensor's (100) movement. Such instruments can be located inside the blocking structure (306) as well. The blocking structure (306) can be made of, for example, aluminum, titanium, kevlar, ETFE, kapton or carbon-fiber-reinforced polymer with a coat of polyurea in order to hold and secure the controller (307) and electronics of the spherical mobile sensor (100). The controller (307), batteries, controller's motor and controller's processor can be situated at the outer layer (101) of the spherical mobile sensor (100) as well, and can control the position of the weights and therefore the spherical mobile sensor's (100) movements in similar ways as indicated above.

In the example embodiment of FIG. 3, by adjusting the weights along the direction of (−x, 0), (0, +x), (−y, 0), (0, +y), (−z, 0), (0, +z) of axles "X", "Y" and "Z", the center of mass of the spherical mobile sensor (100) can be relocated and adjusted to control the direction and the speed of the spherical mobile sensor's (100) movement. For example, the spherical sensor (100) can initiate moving in a desired direction by pushing the weights (305) one after another from the center to the inner skin (103) of the spherical mobile sensor (100) and can control and adjust the speed in order to stop movement, start movement, accelerate or decelerate by bringing all the weights (305) down or by pushing the weights (305) against the direction of the wind, using the controller (307) and the internal source of power such as a battery.

Additionally, the weights (305) can be calibrated in order to maintain the balance and the torque of the spherical mobile sensor (100) and to reduce energy utilized in movement of the spherical mobile sensor (100) (e.g. rolling movement, hopping movement). The controller's (307) motor can use the energy stored in the spherical mobile sensor's (100) energy storage elements (i.e. batteries or capacitors) to control the movements of the spherical mobile sensor (100). By way of example and not of limitation, by actuating the movable weights (305) by using any propellant system (e.g. an axle controlled by the motor inside the controller (307) or a gas or a liquid whose pressure would change by temperature) and adjusting the center of mass inside the spherical sensor (100), the trajectory of the spherical mobile sensor (100) with a controller (307) that can sit for example, in the center of the sphere, can be corrected or altered depending on situation. Moreover, non-holonomic motion planning and control techniques with at least one microcontroller and accelerometer can determine the movements of the weights (305) to affect the motion of the spherical mobile sensor (100).

Figure 5:
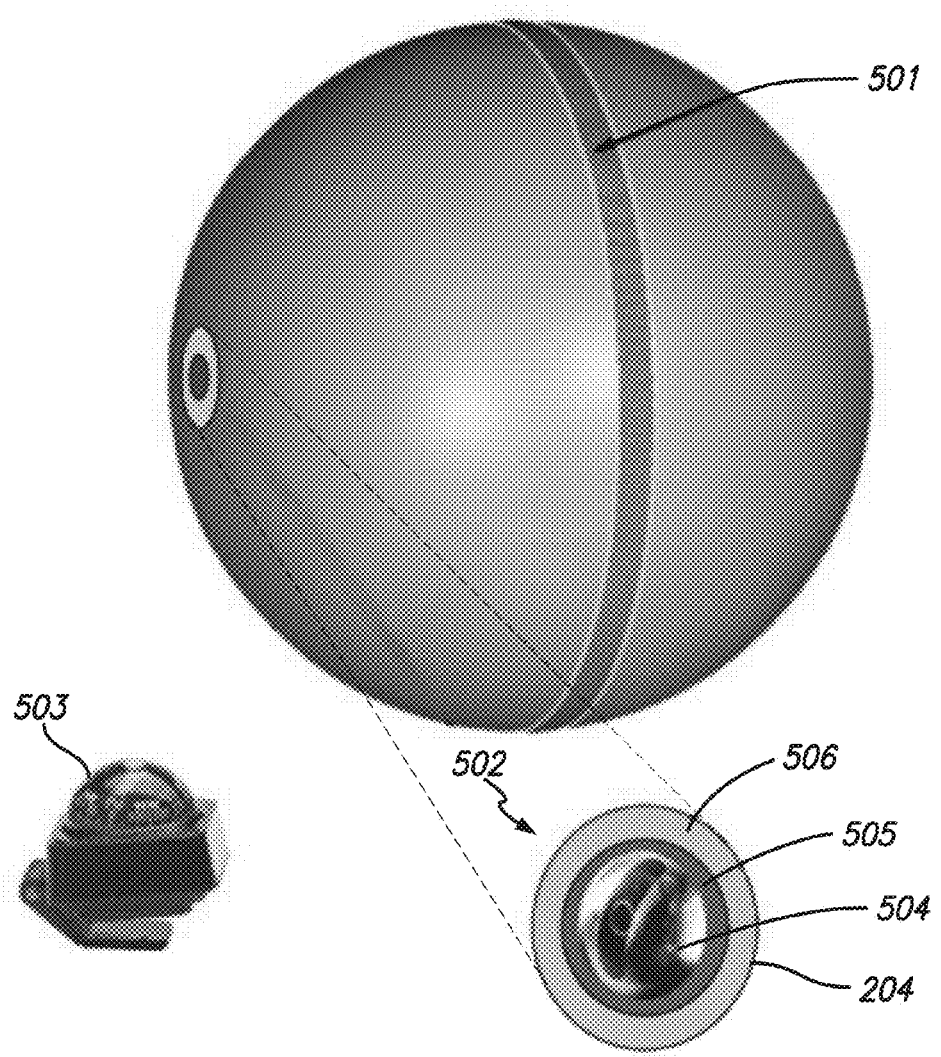
FIG. 5 shows spherical mobile sensor with an enhanced orbit.

As shown in the example embodiment of FIG. 5, by using the spherical mobile sensor's (100) control mechanism (303) (not shown in the figure), the spherical mobile sensor (100) can be rolled over an enhanced orbit (501). If the speed of the spherical mobile sensor (100) and the wind is relatively steady, the weights (305 in FIG. 3) can be adjusted in order to stabilize motion and orientation of the spherical mobile sensor (100) to make it roll just over an enhanced orbit (501). The enhanced orbit (501) could be made of a sturdy material, for example kevlar, and may allow the spherical mobile sensor (100) to roll on this orbit for extended periods of time without any damage. The orientation of the spherical mobile sensor (100) can be defined with respect to the position of the sensors and devices on the spherical mobile sensor (100). For example, the imager (204) may be positioned in a certain place on the spherical mobile sensor (100) and, depending on a desired image of an object, the spherical mobile sensor (100) could be oriented in a certain direction. Gyroscopes (some example for such gyroscopes could be found in reference [20], incorporated herein by reference in its entirety) can be used determine the orientation. The spherical mobile sensor (100) rolling over an enhanced orbit (501) could be help the internal instruments (for example, cameras, spectrometers, etc.) of the sensor to operate properly. In order to increase lifespan of the spherical mobile sensor (100), high tensile resistance materials (for example, kevlar or polyurea) can be integrated on the enhanced orbit (501) of the spherical mobile sensor (100). On the other hand, positioning an imager (204) on a horizontal axis relative to the ground and making the spherical mobile sensor (100) to roll in a stabilized motion around the enhanced orbit (501) can help the imager to capture sharper pictures. Additionally, as mentioned previously, in order to keep the imager's (204) lens (502) stabilized when the rest of the spherical mobile sensor's (100) structure is rolling, a technique similar to a liquid compass (503) can be used. A gyroscopic camera (504) in a gel or a liquid (505), for example, ethanol (which freezes at −114° C.), protected by either sapphire or protective transparent elastomers (506), such as ETFE, etc. can be used in this case. Therefore, the gyroscopic camera (504) can be directed in a fixed position when the rest of the structure of the spherical mobile sensor (100) is spinning around the liquid-like gel or a liquid around the gyroscopic camera (504).

Figure 6:
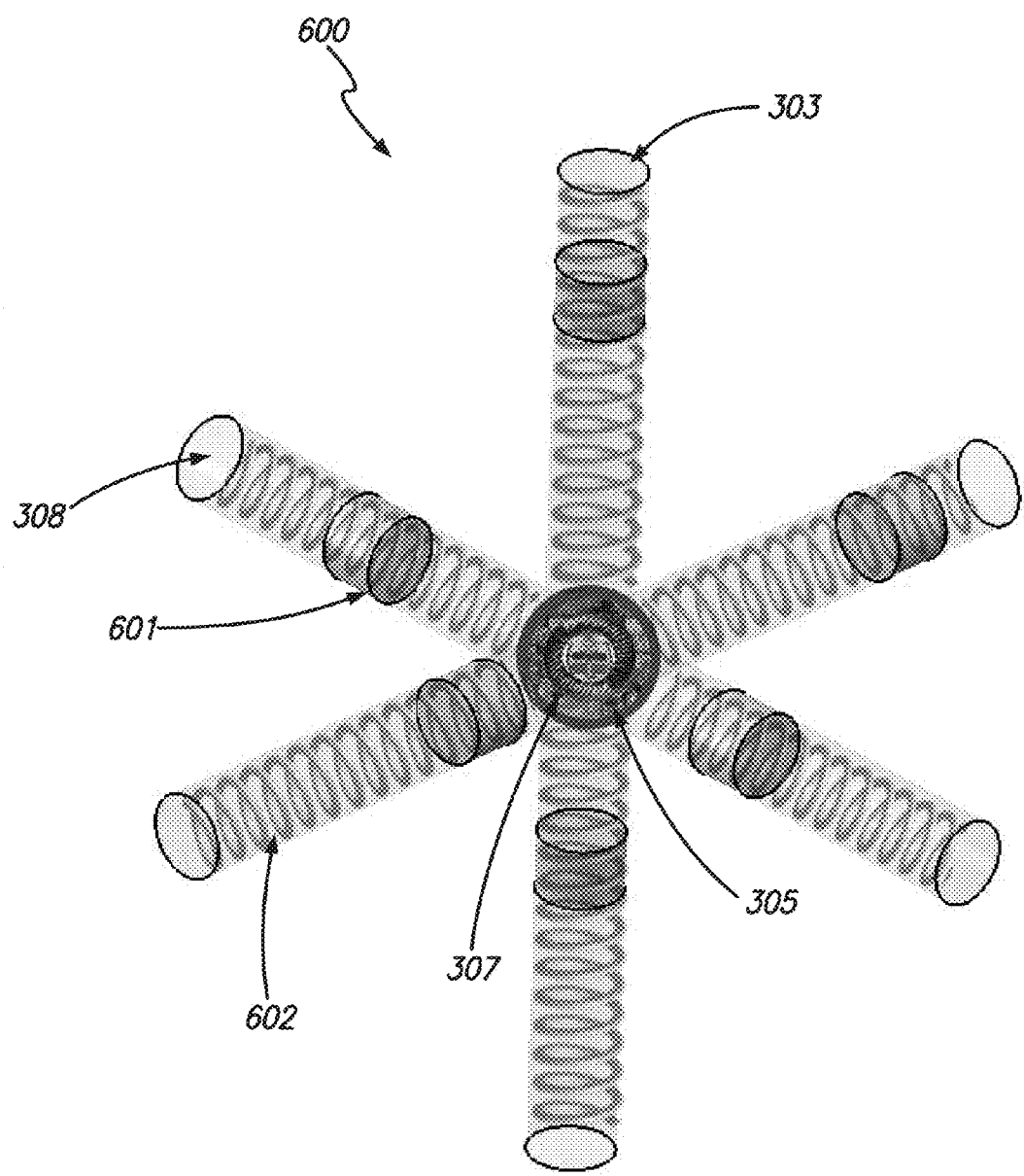
FIG. 6 shows an example embodiment of the control mechanism of the spherical mobile sensor, where magnets are used as weights.

According to an example embodiment of the present disclosure, FIG. 6 shows another embodiment of the control mechanism (600) of spherical mobile sensor (100), where magnets are used as weights. Similar to the previous embodiment of the control mechanism (303) of spherical mobile sensor (100) described in FIG. 3, the example control mechanism of FIG. 6 comprises at least six equal weight magnets (601), two in each axle. Each magnet from the pair of magnets in each axle is separated from the other by a blocking structure (306) located at the junction of the three axles, where the blocking structure (306) blocks the weights from passing through the center of each axle. The level of freedom for each weight can be from the inner skin (103) to the center of the spherical mobile sensor (100) and vice versa. In the example embodiment of FIG. 6, the three axles ("X", "Y" and "Z") with movable magnetic weights (601) are placed inside the tubes (308), where the tubes (308) can be wrapped with a coil (For example coppered or imprinted) to form a solenoid (602), attached to the electronic circuits inside the controller (307). Position of the magnetic weights (601) in the tubes (308) can be adjusted by controlling the amount of electricity sent to the solenoid (602) by the controller (307), where the electricity is generated from the power stored in the spherical mobile sensor's (100) battery. The battery could be placed inside the controller (307) or it could be embedded inside the outer layer (101) or on the inner skin (103) of the spherical mobile sensor (100). The battery could be a rechargeable thin film lithium ion battery. By actuating the movable magnetic weights (601) in a non-centrally symmetric position, the spherical mobile sensor's (100) externally forced motion could be controlled by the controller (307) by changing the center of mass of the spherical sensor (100). Trajectory of the spherical sensor (100) can be corrected or altered by actuating the movable magnetic weights (601). Moreover, a non-holonomic motion planning and control techniques with at least an on-board microcontroller and accelerometer implementation can determine mass movements to affect the motion of the spherical sensor (100). In the absence of an external force, the movable magnetic weights (601) can set the spherical mobile sensor (100) in motion by appropriately moving and creating a torque.

Moreover, if the weights are magnets and the tubes in the control mechanism (303) are covered by solenoid as shown in the example embodiment of FIG. 6, leaving the magnetic weights (601) loose (e.g. the weights are not stiffly positioned in the tube) when the spherical mobile sensor (100) is rolling around, the movements of the magnetic masses (601) within the coils can induce electrical energy based on the Faraday law and the induced energy can be stored in the battery of the spherical mobile sensor (100). Experiments with linear moving mass generators (coupled to capacitive energy storage, some examples can be found in reference [1], incorporated herein by reference by in its entirety) predict that continuously rolling motions of 1-2 meters/second of a 1 meter diameter spherical sensor (100) can generate 1.0-3.0 milliwatts average power over 1 rolling cycle for a magnet pair aligned with the rolling motion. Since according to the example embodiments of the present disclosure, the axles ("X", "Y" and "Z") of the control mechanism (303) of the spherical mobile sensor (100) are orthogonal to one another, the currents and the fields of the three axles could be independent and cannot be coupled with one another. This can make control of the spherical mobile sensor (100) easier as each direction (X, Y or Z) can be controlled independently without taking the coupling of the fields into account. There could be various numbers of axels and various degrees of angles between the axels. However, the design of the control mechamisn as shown in FIG. 6 is an optimized design as described above and for the applications described. This harvested power can be used later either by the spherical mobile sensor's (100) electronics or the controller (303) itself and can make the entire system self-contained, lighter as well as the life span of the spherical sensor (100) longer.

Alternatively, in the example embodiment of FIG. 6, instead of solenoid coil (602) being rolled around the tubes (308) and the magnetic weights (601) moving in the tubes (308), the tubes (308) or the axels can be made of magnets, where the weights could be solenoids, configured to be moved by the controller's (307) internal motor and by axles or other internal propellant system. Therefore, the solenoid-mass can act as an actuator. According to another alternate embodiment of the example embodiment of FIG. 6, instead of using magnetic weights, thermoelectric materials can be used, where any temperature differences could be used to harvest electricity. In order to save the mass needed for harvesting energy as well as controlling the spherical mobile sensor (100), the thermoelectric materials can be placed in the center of the spherical mobile sensor (100) as well. Alternatively, piezoelectric crystals can be used as weights. By moving and hitting the piezoelectric crystal weights, weights inside the tumbling spherical mobile sensor (100) could harvest energy that can be stored in the battery for later use. Additionally, the piezoelectric crystals can be placed on the inner layer (102) of the spherical structure, either in the center or on the inner skin (103), where the loose weights could impact and hit. The impact and the pressure applied by such impact to the piezoelectric crystal may induce some electricity that could be harvested and stored as well.

Figure 7:
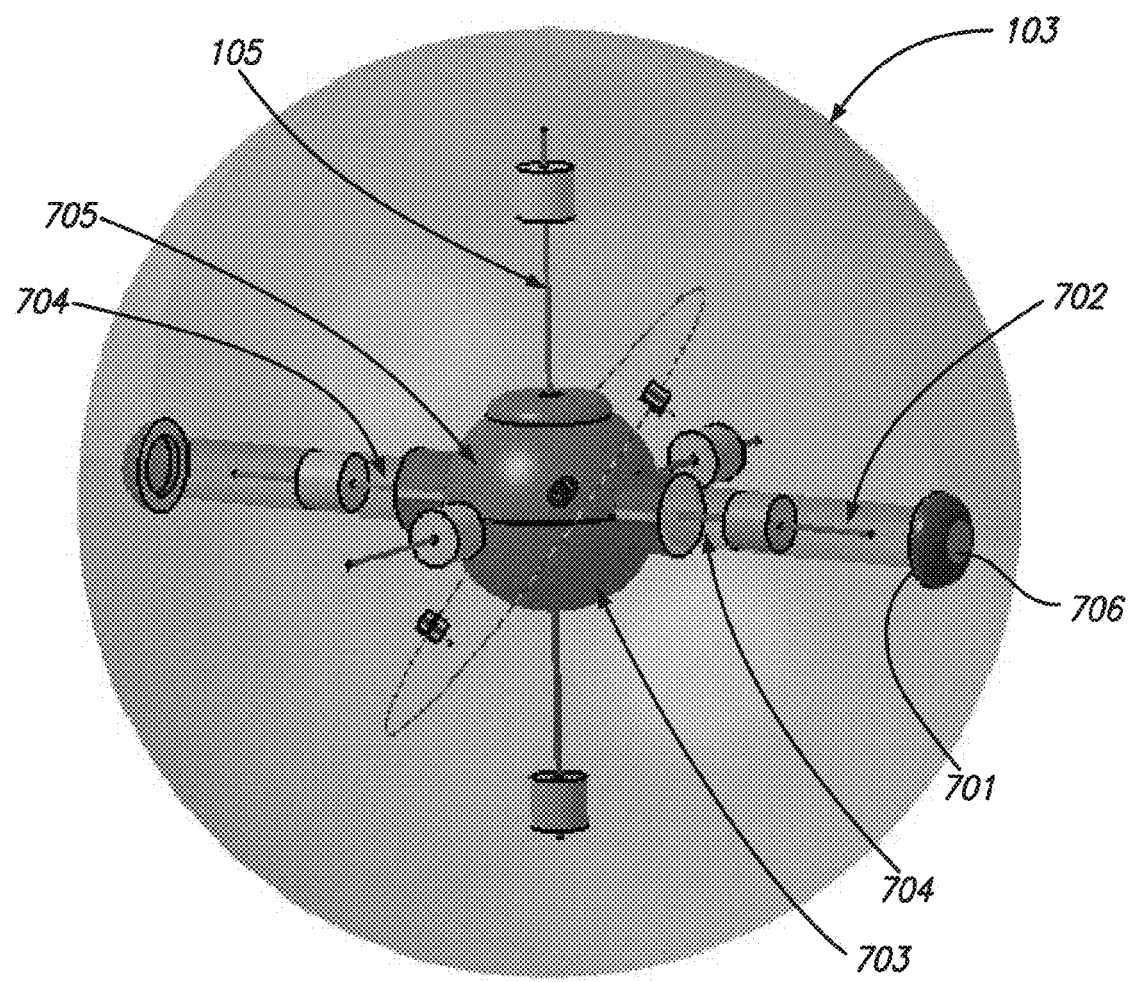
FIGS. 7-9 show example embodiments of the control mechanism of the spherical mobile sensor.

In accordance with the present disclosure, the example embodiment of FIG. 7 illustrates another example embodiment of the control mechanism (303). In this example embodiment, the outer layer (101) of the spherical mobile sensor (100) can be attached by ball bearings (701) to a favorable axle (702) inside the inner layer. The favorable axle (702) can be attached to the central region (703) of the spherical mobile sensor (100) using ball bearings (704) as well. However, in the example embodiment of FIG. 7, other internal parts of the inner layer (102) of the spherical mobile sensor (100) are not attached to the outer layer (101). If an external force such as wind or an internal force can cause the outer layer (101) of the spherical mobile sensor (100) to roll, the components of the inner layer (102) can stay fixed and may not roll because of the ball-bearing attached to the favorable axle (702). Therefore, in the example embodiment of FIG. 7, the components of the inner layer (102) of the spherical mobile sensor (100) can be restrained from rotating while the outer layer (101) of the spherical mobile sensor (100) is rolling around.

Figure 8:
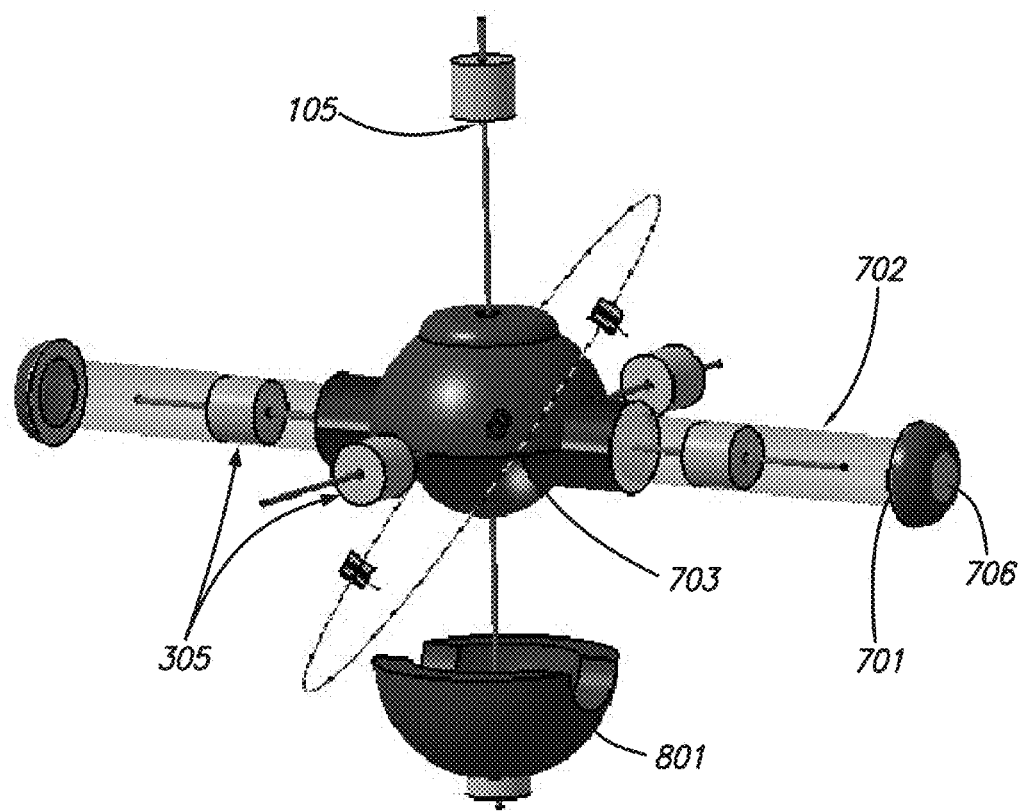
Figure 9:
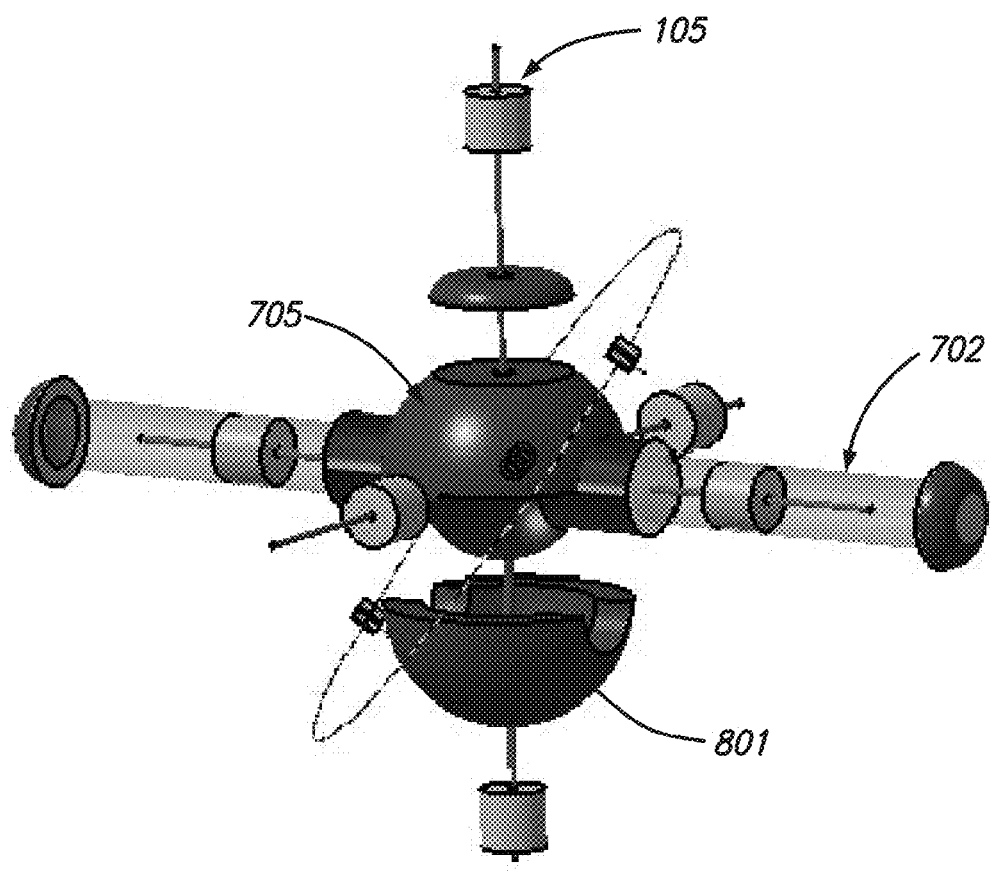

As illustrated in the example embodiments of FIGS. 8-9, when the spherical mobile sensor (100) is moving around under either an internal force or an external force, such as wind, the spherical mobile sensor's (100) orientation can be rotated towards the favorable orientation by pulling out the heavier weight or a part of the central region (801) in the center (703) of the spherical mobile sensor (100), towards the outer layer (101) of the spherical mobile sensor (100). By adjusting the distance of the heavier weight (801) from the center, the speed of the spherical mobile sensor (100) can be adjusted as well. For example, further the heavier weight (801) from the center, slower the speed of the spherical mobile sensor (100) can become. Lowering the heavier weight (801) can cause the center of mass of the spherical mobile sensor (100) to be lowered and the outer layer (101) of the spherical mobile sensor (100) to roll around the favorable axle (702). Thereby, the example embodiment described above and shown in the FIGS. 7-9, can make the spherical mobile sensor (100) to roll around the favorable axle (702) on the preselected orientation with a stabilized speed, which could be useful for many of the instruments integrated into the spherical mobile sensor (100). For example, this feature could be useful when using a directed wireless antenna integrated inside the spherical mobile sensor (100) or when the camera is attached to the middle of the ball bearing (706) of the spherical mobile sensor (100).

In times, when the spherical sensor (100) is tumbling around, the blocking structure (306) can hold the center of mass in the center of the spherical mobile sensor (100) and create a torque for the sensor, and therefore, the spherical mobile sensor (100) can move by a minimum amount of force. However, whenever the spherical sensor (100) needs to stop, the heavier weight (801) in the center (703) could fall from the center towards the inner skin (103) touching the ground as shown in FIG. 8. This can bring the center of mass down and could cause the spherical mobile sensor (100) to suddenly stop decelerate rapidly. On the other hand, if there is a hazardous object along the spherical mobile sensor's (100) path, the same weight (801) can fall down and act as a temporary pendulum in order to forcefully change the direction or get around an obstacle. On the other hand, by adjusting position of the heavier weight (801) relative to the center of the spherical mobile sensor (100), speed of the spherical mobile sensor (100) can be adjusted as well. The lower the controller (307) of the spherical sensor (100) can bring the weight (801), the slower the spherical mobile sensor (100) can get. Adjusting distance of the heavier weight (701) from the center or the blocking structure (306), from the center and the ground, the spherical mobile sensor (100) can roll in a steady speed and in a stabilized way. Additionally, if a lens of a camera or any other imager is attached to the internal structure of the ball bearings (701), the lens can stay steady and straight whenever the outer layer (101) of the spherical mobile sensor (100) is rolling. By adjusting the stiffness of the grip of the structure around the ball bearing (701), the controller (307) can make the rolling spherical sensor (100) to "brake" and decelerate as well.

In the example embodiments of FIGS. 6 and 7, if the central region (703) and the movable weights (305) can be made from magnets and therefore, a fixed centralized magnetic field could be created by laminating a coil inside the outer layer (101) of the spherical mobile sensor (100). Therefore, when the outer layer (101) containing the coils rolls around the favorable axle (702), with the fixed centralized magnetic field (based on the Faraday's law) some electricity and power can be generated. The induced power, could be stored in the internal battery or a capacitor of the spherical mobile sensor (100). The internal battery or a capacitor could be located in the middle of the controller (703), or distributed around the inner skin (103) or the outer layer (101) of the spherical mobile sensor (100). Thin film batteries, for example "rechargeable thin film lithium ion batteries" embedded inside the structure of the inner skin (103) or the outer layer (101) of the spherical mobile sensor (100) can be used as well.

FIGS. 1A and 2-9 show the example embodiment the spherical mobile sensor (100) in the inflated state. The spherical mobile sensor (100) could be deflated as well, before its deployment in an area of interest. As mentioned previously, the one or more diffuser capsules (304), shown in FIG. 3, can contain an inert gas, for example, liquid or solid nitrogen or helium and the cap of the one or more diffuser capsules (304) could be triggered and broken using a NSI (or any other pyrotechnic tool) in order to release the inert gas inside the capsule. The one or more pairs of the disseminator canisters (206), shown in FIGS. 2 and 3, can carry, for example two components (e.g. "isoyanates" and "polyols") to create polyurethane elastomers, which can be used to fill the outer layer (101) of the wind opportunistic controllable spherical mobile sensor (100). The "isoyanates" and "polyols" can be carried separately in each disseminator canisters from the pair of disseminator canisters (206). As mentioned previously, the one or more pairs of disseminator canisters (206) can use, for example, a NASA standard initiator (NSI) or other pyrotechnic tools to trigger or break caps of the one or more pairs of disseminator canisters (206) in order to release its content.

While deflated, all the components inside the inner layer (102), the inner skin (103) and the outer layer (101) of the spherical mobile sensor (100), for example, the tubes (308), the control mechanism (303) and the rigidizable tightening rings (301) can be in a folded and flattened state inside the outer skin (104) of the spherical sensor, where the outer skin can act like a spherical shaped plastic bag carrying the all the components on and inside the inner layer (102), inner skin (103) and the outer layer (101). In a deflated state, the inner layer (102) can be deprived of any inner gas or air and the outer layer (101) can be without any elastomer polymers. Depending on the circumstances and applications, if the spherical mobile sensor (100) need to be inflated, the NSI cap of the diffuser capsules (304) can be broken and the inert gas inside the diffuser capsules (304), for example, nitrogen gas, can be released and consequently, can fill out and inflate the inner layer (102) of the spherical sensor (100) to a spherical shape. The release of the inner gas form the diffuser capsules (304) can cause an over-inflation and can stress the inner skin (103) and the tightening rings (301) laminated inside the inner layer (102), as shown in FIG. 4. This way the inner layer (102) can be inflated to a tight sphere.

There are other known skills of art that could be used to inflate the spherical mobile sensor (100), for example, passing electricity through the carbon-fiber inside the inner layer (102), in order to make the inner layer (103) mechanically stiffed and inflated. This technique (passing electricity through the carbon-fiber in order to make it stiff) could be used to control and adjust the stiffness of the spherical mobile sensor (100). In addition to stressing the tightening rings (301), this process of inflating the inner layer (103) of the spherical sensor can stress out the plurality of the sensors and the electronics laminated on the inner skin (103) and can therefore make them firmly hold their pre-designed shape and position inside the spherical mobile sensor (100). Additionally, the nitrogen or air filled interior of the inflated spherical mobile sensor (100) can help the spherical mobile sensor (100) to become more bouncy. Once the inner skin (103) is fully inflated, the caps of the one or more disseminator canisters (206) can be triggered using NSI to release the "isoyanates" and the "polyols" in the outer layer (101) of the spherical mobile sensor (100). The combination of "isoyanates" and "polyols" can cause a polymerization reaction, which may create the polyurethane elastomer used, for example, to fill out the outer layer (101) of the spherical sensor.

In accordance with the present disclosure, FIGS. 1-9 illustrate the example embodiments of the spherical mobile sensor (100) and its internal skeleton with control mechanism (105). As discussed previously, the spherical mobile sensor (100) can use the power stored in its batteries in order to move around and perform various tasks such as sensing, operating controlling mechanism, data processing and communication. Moreover, as presented in the previous sections, the mass and the diameter of the wind-opportunistic controllable spherical mobile sensor (100) can be customized in order to allow the spherical mobile sensor (100) to exploit the natural ambient forces, for example, speed of the wind (in the environment where the sensor (100) is deployed) to move and harvest energy for its mobility. Additionally, as mentioned above, the spherical mobile sensor (100) can use a combination of its internal propulsion and control mechanism (as shown in FIGS. 1, 3, 7, 8 and 9) and/or external ambient forces to adjust its center of the mass and therefore control its movement (e.g. initiate moving or stopping), speed (e.g. accelerating or decelerating), direction (e.g. change trajectory to avoid hazardous objects or areas, or get closer to an object or area of interest), and orientation (e.g. rotate the spherical structure to a preset favorable side). The spherical mobile sensor (100) can be used indoor as well, if there is enough power available in its batteries required for its internal propulsion and mechanical system to operate.

The spherical mobile sensor (100) can be benefited from the ambient resources if deployed and implemented in the environments such as large deserts, polar regions (e.g. the Arctic, Antarctica, vast tundra and permafrost) or open seas, where the ambient resources, for example, high speed winds or sea-currents, can be exploited by the spherical mobile sensor (100) for its locomotion and energy harvesting. Moreover, the large deserts, polar regions or open seas are vast flat regions devoid of human population and infrastructures with plenty of ambient resources, which can be exploited by the spherical mobile sensor (100) for its traversibility and energy harvesting. By way of example and not of limitation, the sensor (100) can integrate solar arrays in its outer layer (101) to harvest energy from available sunlight. Additionally, the sensor (100) can use its internal mechanics (as previously described and shown in the FIGS. 6, 7, and 8), to harvest kinetic energy from its own motions by the downward rolling gravity, wind, or sea currents. Some special polymers, for example, triboelectric (which can generate or produce electricity by harnessing friction between surfaces) or self-charging power cell (SCPC) (which can harvest mechanical energy more efficiently than systems using separate generators and batteries) can be embedded inside the outer layer (101) to generate power by harvesting the vibration and motion caused by the motions and tumbling of the spherical mobile sensor (100).

Moreover, the spherical mobile sensor (100) can exploit temperature differences available when deployed in the regions, for example, large deserts, polar regions or open seas, in order to harvest energy using thermopile (thermoelectric converter or TEC, which would convert the temperature differences to electric voltage) and the known skills of the art in thermoelectricity techniques. Some of the temperature differences that could be available if the spherical mobile sensor (100) is deployed in the example environments mentioned above are: the diurnal temperature differences in the deserts and polar regions (up to 40° C. differences), the extreme cold in the polar regions, the heat that could be generated by integrating tiny RHUs (radioisotope heater units weight less than 40 grams and can generate 250° C. heat) insulated by aerogels or the temperature differences between the warmer outer layer (101) (which could be made of polymers that could become warm under the direct sun in the open seas) and the colder water of the sea underneath its surface. Additionally, a layer of fujifilm with very high-efficiency thermoelectric (which could generate several milliwatts and can capable of generating electricity with a temperature difference of 1° C.) for example, as discussed in reference [2], could be embedded inside the outer layer (101) or on the control mechanism (103) inside the inner layer (102) to harvest power and generate electricity.

The mass and diameter of the spherical mobile sensor (100) can vary depending on the application and environment where the spherical sensor (100) is deployed, and the presence of an internal power source and mobility drive. For example, if the spherical sensor (100) is deployed in the Arctic region where for example, 75% of the time the average wind speed is 6 m/s and 25% of the time the average wind speed is 9 m/s, then if it is assumed that the spherical sensor (100) depends entirely on wind for mobility and power harvesting, and there is no other internal source of power and internal mobility drive inside the spherical sensor (100), the mass and the diameter of the spherical sensor (100) can be customized in order to make it suitable for moving with the wind speed of the 6 m/s. An already mobile spherical sensor (100) may require less wind speed to maintain its motion compared to a spherical sensor (100) which has started moving from a stationary state, since the coefficient of friction in a moving object is less compared to a stationary object. Additionally, the distribution of torque due to the spherical shape of the sensor (100) can help the spherical sensor (100) to move as well.

As well known in the art, that the force of wind on a body can be represented as $F = \frac{1}{2} \rho v^2 A C_d$, where $\rho = 1.4$ kg/m$^3$ is the typical density of the air in most areas on earth, $v$ is the velocity of the wind, A is the area that the body projects to the wind and $C_d$ is the "coefficient of drag". As also well known in the art, that the force require to overcome the friction and move a stationary object can be represented as $F = \mu mg$, where $\mu$ is the coefficient of friction (for example, the coefficient of friction of a smooth finish polyurea (highly water and tensile resistant elastomer) coating on the spherical mobile sensor (100) over a hard surface (ice) can be 0.14), m is the mass, and g is the gravitational acceleration (on Earth it is 9.8 m/s$^2$). Therefore, in order for the spherical sensor (100) to move from a stationary position, it is require that the force exerted on the spherical mobile sensor (100) by the wind exceed the force needed to overcome friction or $\frac{1}{2} \rho v^2 A C_d > \mu mg$. Now assuming a wind speed of 6 m/s (average speed of wind in Arctic at 75% of the time), $A = \eta r^2$ (area of a sphere) and $C_d = 0.47$ (coefficient of drag for sphere), the approximate masses of the spherical mobile sensor (with a polyurea finish on the ice or a rubber finish over the snow) for different diameters can be calculated from the equation $\frac{1}{2} \rho v^2 A C_d > \mu mg$. Some examples of this calculation are described in tables 1-5.

TABLE 1

Diameter and Mass of the spherical mobile sensor (100), using polyUrea finish over hard ice

| | |
|---|---|
| Speed of Wind: | 6 m/s |
| Density of Atmosphere: | 1.4 kg/m3 |
| Coefficient of Friction | 0.14 pulyUrea over hard ice |
| Coefficient of Drag: | 0.47 Sphere |
| Gravitational acceleration | 9.8 m/s2 |
| Diameter of the Moball | 100 cm |
| Radius of the Moball | 0.5 m |
| Mass of the Moball | 6.776632653 kg |

TABLE 2

Diameter and Mass of the spherical mobile sensor (100), rubber on wet snow

| | |
|---|---|
| Speed of Wind: | 6 m/s |
| Density of Atmosphere: | 1.4 kg/m3 |
| Coefficient of Friction | 0.3 rubber on west snow |
| Coefficient of Drag: | 0.47 Sphere |
| Gravitational acceleration | 9.8 m/s2 |
| Diameter of the Moball | 100 cm |
| Radius of the Moball | 0.5 m |
| Mass of the Moball | 3.162428571 kg |

TABLE 3

Diameter and Mass of the spherical mobile sensor (100), rubber on wet snow

| | |
|---|---|
| Speed of Wind: | 6 m/s |
| Density of Atmosphere: | 1.4 kg/m3 |
| Coefficient of Friction | 0.3 rubber on west snow |
| Coefficient of Drag: | 0.47 Sphere |
| Gravitational acceleration | 9.8 m/s2 |
| Diameter of the Moball | 120 cm |
| Radius of the Moball | 0.6 m |
| Mass of the Moball | 4.553897143 kg |

TABLE 4

Diameter and Mass of the spherical mobile sensor (100), using polyUrea finish over hard ice

| | |
|---|---|
| Speed of Wind: | 6 m/s |
| Density of Atmosphere: | 1.4 kg/m3 |
| Coefficient of Friction | 0.14 pulyUrea over hard ice |
| Coefficient of Drag: | 0.47 Sphere |
| gravitational acceleration | 9.8 m/s2 |
| Diameter of the Moball | 120 cm |

TABLE 4-continued

Diameter and Mass of the spherical mobile sensor (100), using polyUrea finish over hard ice

| | |
|---|---|
| Radius of the Moball | 0.6 m |
| Mass of the Moball | 9.75835102 kg |

TABLE 5

Diameter and Mass of the spherical mobile sensor (100), using polyUrea finish over hard ice

| | |
|---|---|
| Speed of Wind: | 6 m/s |
| Density of Atmosphere: | 1.4 kg/m3 |
| Coefficient of Friction | 0.14 pulyUrea over hard ice |
| Coefficient of Drag: | 0.47 Sphere |
| gravitational acceleration | 9.8 m/s2 |
| Diameter of the Moball | 150 cm |
| Radius of the Moball | 0.75 m |
| Mass of the Moball | 15.24742347 kg |

From the above table it can be concluded that, a relatively heavier spherical mobile sensor (100) (for example, 15.247 kg) may require either an increased diameter (for example, 150 am) or an additional power source and internal mobility drive compared to a lighter sensor (100) (for example, 3.162 kg with a diameter of 100 cm) in order to move by an average wind speed of 6 m/s. Another option could be to move the relatively heavier spherical sensor (100) by the wind of higher speed, for example, 9 m/s, while not making any changes to the diameter and the other internal component of the spherical sensor (100). In that case, the spherical mobile sensor (100) could stay mobile for 25% of the time instead of 75% of the time, compared to be moved by the wind of the speed of 6 m/s.

The following tables 6-9 show some example design of the spherical mobile sensor (100) with different materials.

TABLE 6

The spherical mobile sensor (100) density calculation using TRYMER ® 1800

| | |
|---|---|
| Foam density (TRYMER ® 1800): | 28.8 kg/m3 |
| The Spherical Mobile Sensor (100) Diameter: | 100 cm |
| Outer layer (101) thickness: | 5 cm |
| Hollow inner layer (102) Diameter: | 90 cm |
| The Spherical Mobile Sensor (100) Volume: | 522500 cm3 |
| The Spherical Mobile Sensor (100) | 0.52 m3 |
| Hollow inner layer (102) Volume: | 381415 cm3 |
| Hollow inner layer (102)e Volume: | 0.38 m3 |
| Outer layer (101) Volume: | 141085 cm3 |
| Outer layer (101) Volume: | 0.14 cm3 |
| Outer layer (101) Mass: | 4.06 kg |

TABLE 7

The spherical mobile sensor (100) density calculation using metallic microlattice

| | |
|---|---|
| Foam density (Metallic microlattice): | 2.1 kg/m3 |
| The Spherical Mobile Sensor (100) Diameter: | 100 cm |
| Outer layer (101) thickness: | 5 cm |
| Hollow inner layer (102) Diameter: | 90 cm |
| The Spherical Mobile Sensor (100) Volume: | 522500 cm3 |
| The Spherical Mobile Sensor (100) | 0.52 m3 |
| Hollow inner layer (102) Volume: | 381415 cm3 |
| Hollow inner layer (102)e Volume: | 0.38 m3 |
| Outer layer (101) Volume: | 141085 cm3 |
| Outer layer (101) Volume: | 0.14 cm3 |
| Outer layer (101) Mass: | .30 kg |

TABLE 8

The spherical mobile sensor (100) inner skin mass calculation using kepton

| Material: | Kapton |
|---|---|
| Skin (103) Thickness: | 10 mils |
| Skin (103) Thickness: | 0.0254 cm |
| Outer layer (101) Surface area: | 31415 cm2 |
| Skin (103) Volume: | 797.9 cm3 |
| Kapton's Density: | 1.42 gm/cm3 |
| Outer layer (101) Surface area: | 100 cm |
| Skin (103) Mass: | 1133.1 gm |
| Skin (103) Mass: | 1.13 kg |

TABLE 9

Tightening rings (301) using Carbon-Fiber

| | |
|---|---|
| Number of (Tightening rings (301): | 4 Number |
| Length (diameter): | 314 cm |
| (Tightening rings (301) Width: | 2 cm |
| (Tightening rings (301) Thickness: | 0.15 cm |
| Density: | 1.65 gm/cm3 |
| Mass per (Tightening rings (301): | 155.43 |
| Total mass: | 621.72 gm |
| Total mass: | 0.62 kg |

Based on the known skills of the art, one can estimate an approximate amount of power (energy) that could be harvested using different techniques (as discussed above) by the wind-opportunistic controllable spherical mobile sensor (100). Some examples of such estimations can be found in reference [3], incorporated herein by reference in its entirety. In reference [3], the summary of power vs. volume has been given for some of the recent power scavengers (primarily inertial and thermal), highlighting the different transduction technologies, including piezoelectric (PE), electromagnetic (EM), electrostatic (ES), and thermoelectric (TE). The size and power level of these scavengers can vary over a large range, depending on the application area and available technologies for a specific scavenger. Smaller size scavengers can produce approximately 10-100 $\mu w/cm^3$, while larger scavengers can produce approximately 100 $\mu W$ to several $mW/cm^3$. Since, the spherical mobile sensor (100) can be as large as 20-50 cm in diameter, it can be expected that the spherical mobile sensor (100) can harvest as much as several watts. Although, this energy scavenging may not be continuous. For example, if it is assumed that the spherical mobile sensor (100) can harvest energy and therefore can generate power for only 1 hour a day, then with the rate mentioned above, the spherical mobile sensor (100) can harvest as much as 3000-4000 Joules of energy. The energy harvested this way could be used to operate the internal components and control mechanism of the spherical mobile sensor (100).

As mentioned previously, a spherical mobile sensor (100) can be implemented as an autonomous instrument capable of performing various tasks using different electronics, microdevices and the imagers integrated on the inner skin (103) and the outer layer (101), while traversing the area where it is deployed. Depending on the types of sensors, instruments and other components integrated into the spherical mobile sensor (100), it can perform different tasks. For example, using different imagers and its stabilizing components as described previously, the spherical mobile sensor (100) can take pictures or videos using different active and passive sensors or spectrometers (some example spectrometers can be found in reference [4], incorporated herein by reference in its entirety), it can identify and measure different environmental factors and conditions (e.g. wind patterns, topography of the area, temperature, pressure, etc.), chemical compositions, pollutants, gases, radiations (using Geiger tube [β, γ](Beta and Gamma)), minerals, vibration, cracks, mass detectors and the type of snow or crystals for the minerals around (using ultrasound sensors bellow, or miniature mass spectrometer (MMS)). Some example sensors can be found in reference [4], incorporated herein by reference in its entirety.

According to the example embodiments of the present disclosure, the spherical mobile sensor (100) can use acoustic, infrared, metal detectors (for example, the inductive sensors as described in reference [5], incorporated herein by reference in its entirety), or other sensors used in the known state-of-the art minesweepers (some examples of such sensors can be found in reference [6], incorporated herein by reference in its entirety) to detect and map landmines. The spherical mobile sensor (100) can use various known skills in the art, for example, ultrasonic detectors, radar, vibration (some examples of such sensors can be found in references [4]-[20], incorporated herein by reference in its entirety) and acoustic detectors to detect and monitor movements, vibrations, or various objects such as sea-mines, submarines, animals, etc. The spherical mobile sensor (100) can be equipped with various tools or robotics coming out of its structure in order to perform specific tasks, for example, cutting wires in landmine fields etc. The spherical mobile sensor (100) can be made of very heavy materials to explode the landmines in its place.

In accordance with the present disclosure, the example embodiments of the spherical mobile sensor (100) can be used to clean up oil or chemical pollutant spills as well. The outer layer (101) of the sensor (100) can be made of sorbent materials in order to remove oil or chemical pollutant spillages either by adsorption (the oil adheres to the surface of the material) or by absorption (the oil penetrates the pores of the material and is trapped inside). For example, the outer layer (101) of the spherical mobile sensor (100) can be made out of foams such as highly oil-absorbent polyurethane foam (PUF) materials or microorganism-immobilized polyurethane foams, which could absorb and degrade the oil spillages. Some examples of such foams could be found in reference [23], incorporated herein by reference in its entirety. Additionally, the disseminator canisters (206) and tubular ring (302) could be filled with bioremediation bacteria (such as microbial xenobiotic metabolism to degrade, transform or accumulate oil droplets), which can eat oil. The disseminator canisters (206) and tubular ring (302) could be filled with chemical dispersants (for example corexit 9500A), to break down the oil in the water into small droplets. The spherical mobile sensor (100) can be equipped with spectrometers or other sensors which can detect oil drops, and if any spillage gets detected, it can trigger the cap of the disseminator canisters (206) and consequently, the contents of the disseminator canisters (206) and the attached tubular ring (302) can be released in the foam at the outer layer (101). When the spherical mobile sensor (100) is rolling around on the oil spilled area of the sea, the bioremediation bacteria or the chemical dispersants soaked foam at the outer layer (101), can spread the bioremediation bacteria or the chemical dispersants around the area, which can help to resolve the oil spillage.

Moreover, in accordance with the present disclosure, the example embodiments of the spherical mobile sensor (100) can have processing and communication capabilities as well. The spherical mobile sensor (100) can use, for example, a PCI-based 750 MHz PowerPC system as its microprocessor (202) (for its internal processing and computation), LM629 precision motion micro controller chip (to act as its controller (307)), and radiation hardened memory (which could be less susceptible to damages from radiation). The spherical mobile sensor (100) can communicate by using antenna and transceiver (203). As mentioned previously, the axles the in the control mechanism (303), the spokes (208) (in the FIG. 2) and/or the tightening rings (301) can be used as antennas as well. Moreover, if the example embodiment of the control mechanism of FIGS. 7-9 is used for the spherical mobile sensors (100), then the inner skeleton (105) and therefore any antenna that would be integrated inside the inner skeleton (105) wouldn't move when the outer layer (101) rolls. This feature of the spherical mobile sensor (100) can be utilized in using direct antennas, which could be very helpful as it would save energy when the spherical mobile sensor (100) communicates wirelessly with the communication satellites or base stations.

The spherical mobile sensor (100), according the example embodiments of the present disclosure, can use low-power and low-mass transceivers (203) and modems in order to have a peer-to-peer communication with other sensors (100) in the area where they are deployed. Additionally, the spherical mobile sensor (100) can communicate with an orbiting satellite or a base station as well. For example, the spherical mobile sensor (100) can use waspmote transceivers (which weighs 20 gm, and its operational temperature is −20° C., +65° C.), in order to have a peer-to-peer communication with other wind-opportunistic controllable spherical mobile sensors (100), or an iridium modem (for example, iridium core 9523, weight 32 gm and operation temperature is −30° C. to +70° C.) which can help the spherical mobile sensor (101) to have communication with, for example, a iridium satellite system with a pole-to-pole global coverage. Some example transceivers can be found in reference [4], incorporated herein by reference in its entirety.

In accordance with the present disclosure, the example embodiments of the spherical mobile sensor (100) can perform calculations, computations, processing tasks and it can receive, send, or relay commands, information and messages, which can help the sensor (100) to perform its tasks and responsibilities safely, optimally and intelligently. For example, if the spherical mobile sensor (100) receives a command, which provides the sensor with a priority of tasks needed to be done in an area of interest, the spherical mobile sensor (100) can use its microprocessor (202) and controller (307) to control the operation of its internal sensors, instruments, and actuators in order to perform the tasks as instructed.

The spherical mobile sensor (100), according the example embodiments of the present disclosure, can receive information about the wind pattern and weather forecast of the area where it is deployed or if there is any obstacle or hazardous objects in the area of its performance, which should be avoided. Using the micro-processors (202), controllers (307) and actuators, the spherical mobile sensor (100) can decide to stop (for example, by bringing all its weights down, or by getting deflated from an inflated state) or change its trajectory if possible. For example, if the spherical mobile sensor (100) receives a message, which instructs the sensor (100) to go to a certain area of interest, spherical mobile sensor (100) could do so by checking its current location, the wind direction (using its wind sensors or the data regarding the wind pattern that could have been sent to it by other neighboring sensors or satellite or a base station) and the location of its destination. If the direction of the wind at that moment is favorable with respect to the spherical mobile sensors (100) destination (i.e. the wind direction can help the sensor (100) to move towards its destination), the spherical mobile sensor (100) can utilize the speed and direction of the wind to drive its locomotive towards its destination. Otherwise the sensor (100) can use its actuators to stop and wait until a wind in the desired direction blows and then, if the sensor is at stationary state, it can bring its center of mass up or get inflated to move by the favorable wind direction to its desired destination. On the other hand, depending on how far the desired destination is, and how much power is left in the sensor's (100) rechargeable batteries, the spherical mobile sensor (100) might decide to use its control mechanism (303) to move towards the desired destination. Since, the spherical mobile sensor (100) can be controlled, to go to an desire area or can be stopped to avoid an undesired direction or area, they could be able to kept inside an area of interest, while they are still moving around in the that specific area to perform some specific tasks (For example monitoring the area, cleaning up the oil spills in the area, looking for landmines or the minerals of interest in the specific area).

Figure 10:
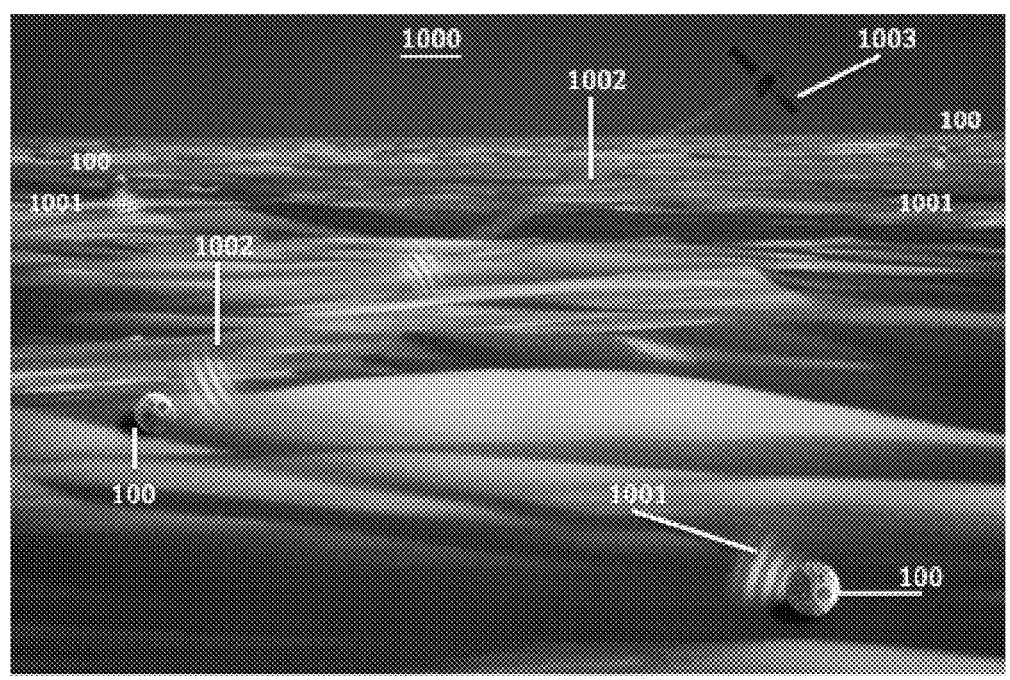
FIGS. 10-11 show a system of sensors comprising a plurality of spherical mobile sensors.
Figure 11:
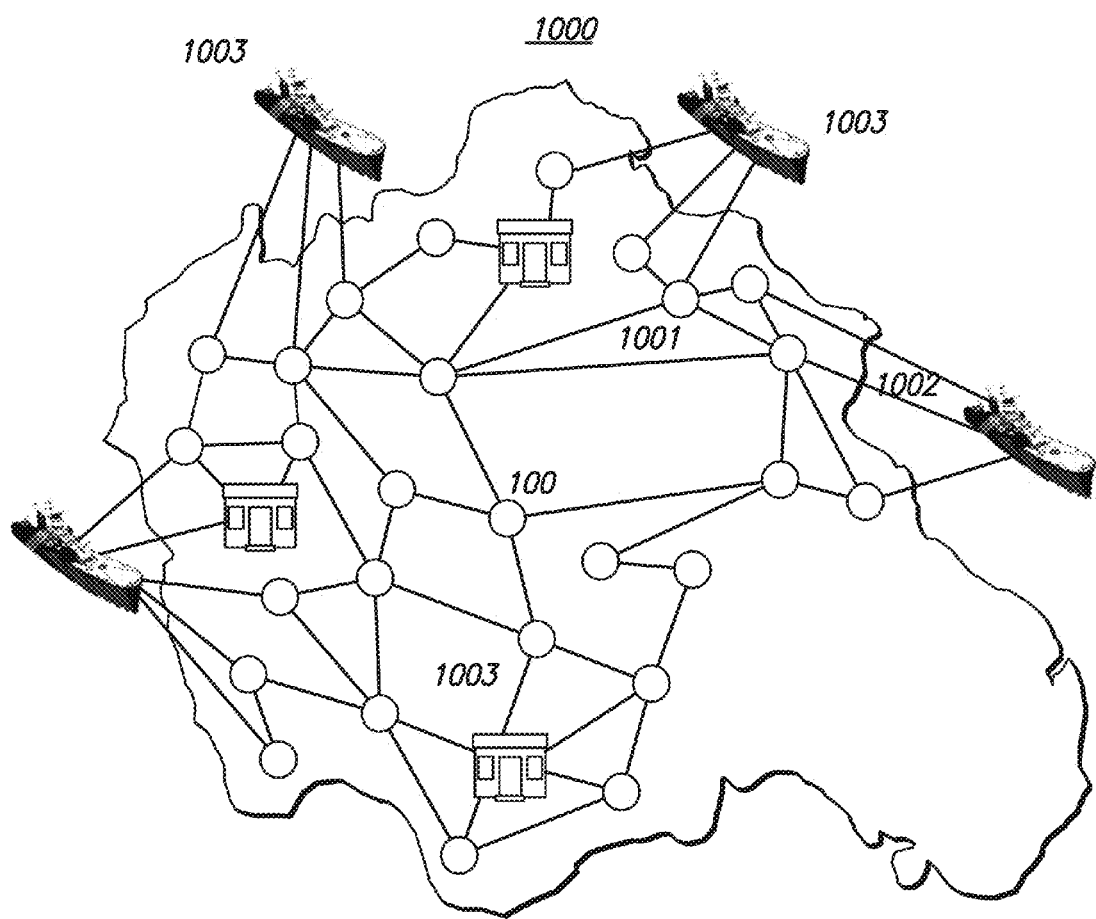

According to an example embodiment of the present disclosure, FIGS. 10-11 show a system of sensors (1000) comprising a plurality of spherical mobile sensors (100). As mentioned previously each spherical mobile sensor (100) can be configured to have a peer-to-peer communication (1001) capability with other spherical mobile sensors (100) within the system of sensors. Therefore, a plurality of peer-to-peer connected wind-opportunistic controllable spherical mobile sensors (100) can form a network of sensors within the system of sensors (1000). Moreover, each spherical mobile sensor (100) within the system of sensors (1000) can have communication capabilities (1002) with base stations (1003) for example, ground base stations, vehicles, ships, aircraft, balloons, submarines, buoys, personnel's laptops, or orbiting satellites. The system of sensors (1000) can comprise a controllable dynamic wireless mesh network of spherical mobile sensors, as illustrated in FIGS. 10-11. The controllable dynamic wireless mesh network of spherical mobile sensors (1000) as illustrated in FIGS. 10-11 could interface with a global control system that can ensure a region-wide coverage while optimizing the wind-opportunistic controllable spherical mobile sensors' (100) efforts by sharing the tasks and responsibilities (e.g. sensing the environment, tracking targets, communication with the base stations (1003), etc.) among them intelligently according to their available resources (for example, power, memory, bandwidth, structure's endurance, chemicals that need to be spread out, etc.), quality of performance of the entire system of sensors (1000) (for example, how soon or with what resolution the system is able to scan the whole are of interest), and the priority of the sub-regions with high strategic value or urgency for the stakeholders. Scanning an area can be defined as the following actions by the mobile sensors while passing through the area: (a) Examining the area (using its sensors and instruments) to detect and locate the possible targets, and (b) Updating the map of the area which would be collectively updated by wireless mesh network of sensors (1000).

Tables 10-11 illustrate the calculations and specification for the communication level inside the controllable dynamic wireless mesh network of wind-opportunistic spherical mobile sensors (1000). Although the level of communication required by the collaborative task sharing strategies of the spherical mobile sensor (100) may be power-intensive, the spherical mobile sensor (100) could be programmed to keep expensive satellite communications to a minimum, and use very-low power micro-RF techniques for peer-to-peer communication. Different calculations can show that with reasonable power consumption such communication between different spherical mobile sensors (100) can take place over distances more than 100 km for low data rates, for example, 100 Kb/s. The wind-opportunistic controllable spherical mobile sensor's (100) ability to autonomously communicate with its peers and exchange information about its operational status, and the environmental data it has gathered, can be critical since that exchange of information constitutes the basic link unifying the controllable dynamic wireless mesh network of wind-opportunistic spherical mobile sensors (1000). Since the expected energy scavenging level per day for the wind-opportunistic controllable spherical mobile sensor (100) is approximately 30,000-40,000 Joules, the maximum power consumption of the transceiver in each the wind-opportunistic controllable spherical mobile sensors (100) is designed to be less than 100 mW, which is equivalent to more than 100 hours of consecutive peer-to-peer communication. In order to increase the communication distance with a reasonable data rate, quadrature phase shift keying (QPSK) can be used as a modulation technique for both uplink and downlink communication. QPSK can provide a spectral efficiency of about 1.6 bits/Hz and requires a SNR of at least 14 dB for a bit-error-rate (BER) of at most $10^{-6}$. In order to maximize the propagation distance given an antenna size of less than 10 cm (which is guaranteed to be smaller than the diameter of the wind-opportunistic controllable spherical mobile sensor (100)), the 433 to 434 MHz frequency band available for ISM applications is the most suitable once. Based on this selection, the link budget can be calculated as shown in table 11. The maximum communication distance is estimated to be 100 km with a maximum date rate of 320 kb/s. The expected number of wind-opportunistic controllable spherical mobile sensors (100) can be in the order of 1000 for a global coverage exceeding 10 Mkm2. However, this number may be higher to increase the overall robustness of the system when considering possible failures of some of the wind-opportunistic controllable spherical mobile sensors (100) in the field due to rare but extreme environmental conditions such as extreme winds or snow storms.

TABLE 10

Data Rate Estimation
Data Rate Estimation for 433 MHz ISM band (433.05-434.79 MHz)

| Parameter | Value | Comments |
|---|---|---|
| Efficiency in bits/Hz | ~1.6 | |
| Required SNR for BER = $10^{-6}$ (QPSK) | ~14 dB | |
| Bandwidth | 200 kHz | |
| Data Rate | 320 kbps | Bandwidth * 1.6 bit/Hz |

TABLE 11

Expected performance of the distributed mobile sensor system
Link Budget for 433 MHz band (433.05-434.79 MHz)

| Parameter | Value | Comments |
|---|---|---|
| Bandwidth (BW) | 200 KHz | |
| Transmit Power ($P_{TX}$) | 20 dBm | Typical power of 100 mW |
| Transmit Antenna Gain | 5 dBi | Typical Omni-directional antenna |
| Receive Antenna Gain | 5 dBi | Typical Omni-directional antenna |
| Max. Path Distance | 100 km | |

TABLE 11-continued

Expected performance of the distributed mobile sensor system
Link Budget for 433 MHz band (433.05-434.79 MHz)

| Parameter | Value | Comments |
|---|---|---|
| Path Loss (100 km) | 127 dB | $L(dB) = 10\log\left(\frac{4\pi f_c}{c}\right)^2$ |
| | | $+ 20 \log(D)$ |
| | | +Atmosphere attenuation |
| | | Drizzle Rain (0.25 mm/hour) |
| | | introduces loss of 0.02 dB/km |
| Received Power | −97 dBm | |
| Received Sensitivity Required | ~100 dBm | |
| Thermal Noise Power (300K) | −121 dBm | Thermal Noise seen by receive antenna |
| Receiver Noise Figure | 4 dB | |
| SNR of received signal | 20 dB | |
| Error Correction Gain | 4 dB | |
| SNR for BER = $10^{-6}$ (QPSK) | 14 dB | |
| Link Margin | 10 dB | |

Figure 12:
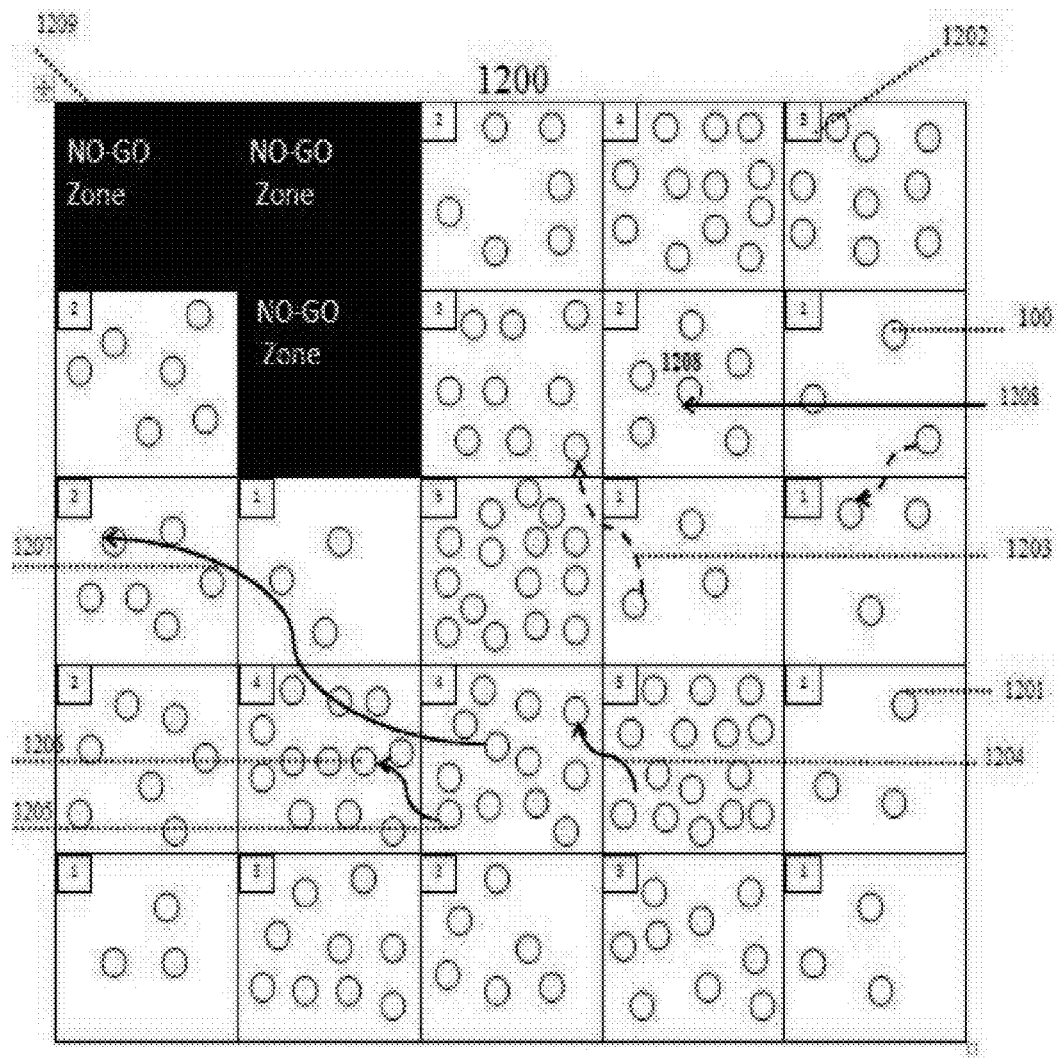
FIG. 12 shows the distributed control architecture of the wireless mesh network of sensors.

In accordance with the presented disclosure, the example embodiment of FIG. 12 shows the distributed control architecture (1200) of the wireless mesh network of sensors (1000). The Distributed Control Architecture (1200) makes use of the controllable dynamic wireless mesh network of sensors (1000) to transmit the control signals and commands and to receive measurements and data from the spherical mobile sensors (100). As described previously the spherical mobile sensors (100) can be configured to be stopped (1203), or keep going (1204) either by using different rigidizable structures, or different example embodiments of the control mechanism (303) presented in previous sections. Also, as previously described, the mass, diameter, as well as the control mechanism (303) can be customized according to applications and environment conditions in the area (for example, the speed of the wind, the speed of the current, the density of the water, and the density of the atmosphere, etc.), where the sensor (100) is deployed. Therefore, as mentioned previously, if a spherical mobile sensor (100) receives a command to stop (1203), it can be able to do so, by either deflating, or bringing its center of mass down in order to stop. On the other hand if the spherical mobile sensor (100) receives a command to keep-going (1204), it can keep its center of mass in the center, can stay inflated and can use either its internal or external propulsion system (for example (control mechanism (303)) in order to keep, or resume its movement.

As previously described, the stop (1203) and keep-going (1204) capabilities of the spherical mobile sensor (100) can be used to restrict the spherical mobile sensor (100) in any given area. The control mechanism (303) can provide more than stop and go functionalities. In particular, the control mechanism (303) can change the trajectory of the spherical mobile sensor (100), for example, to the left or to the right, by bringing the center of the mass to the left side or to the right side of the spherical mobile sensors (100), while it is moving. Trajectory can be changed by using sails or air controlling tools as well. For example, if outside air is pumped inside the sensor (100) from one side of the spherical mobile sensor (100) and the air inside the sensor (100) is pumped out from another side, based on the reaction forces, the sensor's (100) trajectory can be changed to left or right. According to the example embodiments of the present disclosure, the stop (1203) command received by the spherical mobile sensors (100) can be assumed as command for either complete stop or change of direction and keep-going (1204) command received by the spherical mobile sensors (100) can be interpreted as either resuming the movement from a standstill condition by the internal propulsion mechanism or external forces, or keep going if the spherical mobile sensors (100), is already moving.

The distributed control architecture (1200), as shown in the example embodiment of FIG. 12, can ensure that the spherical mobile sensors (100) cover a specific sub region grid (1201) uniformly in terms of the number of sensors (100) and their available resources (e.g. memory, energy, bandwidth, the chemicals that they might need to spread) while considering the priority ranking (1202) of the sub region grid (1201) as well. The sub region grids (1201) could be defined by the stakeholders of the system in order to cluster the efforts and the performance of the entire wireless mesh network of sensors (1000) based on the importance of that region, or based on some specific environmental characteristics that can make the region preferable over other sub region grids (1201). For those stake holders that use the controllable dynamic wireless mesh network of sensors (1000) as a scanner, which can map a larger area in order to search for some particular target or in order to monitor the area, by dividing the larger region into smaller sub region grids (1201), can use a divide and conquer strategy for distributing the mobile sensors (100) and increasing the speed of the sensor system (1000).

The priority ranking (1202) of each sub region grid (1201) can be the level of importance (in terms of monitoring) of each sub region grid (1201) as determined by the system's stakeholders. The priority ranking (1202) of each sub region grid (1201) could be set by the events happening in that sub region grid (1201). When the priority ranking (1202) of a region is set to a higher level, the wireless mesh network of sensors (1000) can reconfigure itself to provide more resources to that sub region grid (1201). For example, if the stake holder of the wireless mesh network of sensors (1000) is interested in finding some kind of a mineral, the sub region grids (1201) with higher percentage of signs of the minerals can be given a higher priority ranking (1202). As a result, the wireless mesh network of sensors (1000) can focus on sub region grids (1201) that have a higher chance of finding the mineral of the interest.

Moreover, the distributed control architecture (1200) of the wireless mesh network of sensors (1000), as illustrated in FIG. 12, can consider the rate of energy generation of each spherical mobile sensor (100) in each sub region grid (1201) as well. For example, based on the amount of sunlight the sensors (100) could be exposed to or the strength of the wind in that sub region grid (1201), the spherical mobile sensors (100) in each sub region grid (1201) might have varying potential for generating and harvesting energy. This variation could be considered in the distributed control architecture (1200) of the wireless mesh network of sensors (1000).

The proper distribution of the sensors (100) inside the sub region grid (1201) with a high strategic value priority ranking (1202) can ensure that there are always enough sensors (100) to pick up the tasks that others have left off. For example, if the main task of the wireless mesh network of sensors (1000) is to monitor an area and track a moving target, and if the speed and direction of the spherical mobile sensor (100) tracking the target is such that it cannot keep up with the target, then the sensor (100) could broadcast the characteristics of the target (for example, its importance, speed, location, estimated trajectory) to other sensors (100) via peer-to-peer communication (1001). In this manner, sensors (100) on the path of the moving target can observe the target's appearance and can keep monitoring it. Additionally, the sub region grids (1201) that have been estimated to be along the trajectory of the moving target can be moved to a higher priority ranking (1202). This may cause more wind-opportunistic controllable spherical mobile sensors (100) with more resources to go to this sub region grid (1201) and be ready to monitor the moving target. For this purpose, as illustrated in FIG. 12, the region of interest can divided into sub region grid (1201). Each of the sub regions can be assigned with a strategic priority ranking (1202) that rates its priority for monitoring purposes. FIG. 12 further illustrates black sub region grids (1201) representing no-go zones (1209) that can be desirable to be avoided by the wind-opportunistic controllable spherical mobile sensors (100).

The distributed control architecture (1200), as illustrated in the example embodiment of FIG. 12, can be in charge of determining the optimum distribution of sensors (100) for all sub region grid (1201). This optimization can consider the following variables, for example, the total number of sensors (100), the total amount of available memory for the system of sensors (100), each sensor's (100) energy reserve, available bandwidth, harvested energy based on the sub region grid (1201) local conditions (e.g. wind intensity, available sunlight) and the sub region grid's (1201) ranking priority (1202). Depending on the application, more resources might be considered to be optimized over the entire system of sensors (1000). For example, if the sensors (100) are used to spread some bacteria over an area with oil spillage, the distributed control architecture (1200) can make sure that the available resources (i.e. oil eater bacteria) are optimized over the entire network of sensors (1000). The distributed control architecture (1200) might consider optimizing the available durability of the sensors (100) among the wireless mesh network of sensors (1000) as well.

According to the example embodiment of FIG. 12, the distributed control architecture (1200) can influence the base-stations (1003) or the satellites to send certain information, messages or instructions in a centralized manner to all or some specific sensors (100) using the wireless mesh network of sensors (1000). For example, a centralized order to avoid certain sub region grids can be given to the sensors (100) in a particular area by marking those sub-region grids a no-go-zone (1209) or by making the priority ranking (1202) of that those sub region grids (1201) be the lowest. Therefore, the sensors (100) can make sure that they would stop within a safe distance from the no-go-zone (1209) and will not enter the no-go-zone (1209). By way of another example, the sensors (100) can receive a centralized message which could provide them with the weather forecast and wind-direction for the next few days, which could help the sensors (100) to decide about their scanning strategies for the sub region grid (1201) they are in. For example, if the sensors receive a forecast of rain, the sensors (100) can realize that the power that could have been harvested through solar energy could be limited and therefore, they would avoid energy-consuming tasks such as taking pictures.

Moreover, the stakeholders of the entire wireless mesh network of sensors (1000) might decide that, all the sensors (100) in certain sub region grids (1201) can perform specific tasks according to priority and resolution. For example, a vessel which carries out a marine transportation in some areas in the Arctic, can use the wireless mesh network of sensors (1000) to identify an open sea route towards its destination. In order to accrue this information, the vessel might send a centralized command to the sensors (100) used in the sub region grid (1201) to report the condition and the topography of ice in the sub region grid (1201) of interest before using their power on any other task or before getting away from the sub region grid (1201). Therefore, the distributed control architecture (1200) can make sure that the first priority of the sensors (100) is to report the condition of ice and ice topography to the vessel.

The distributed control architecture (1200) of the wireless mesh network of sensors (1000) can ensure that the sensors (100) within each sub region grid (1201) would negotiate with each other in order to share tasks and optimize the use of local system resources. In each sub region grid (1201), there could be a dynamic supervising-peer (1208) that would recommend the major decisions needed to be made inside a sub region grid (1201). For example, the dynamic supervising-peer (1208) could decide if a sensors (100) which is about to leave the sub region grid (1201), could actually leave (1205) the sub region grid (1201), or it should stop (1203), and this decision can be made based on the condition of the wind or/and the sea current (the speed and the direction). On the other hand, if a sensor (100) is entering (1206) the sub region grid (1201), the level of resources of the entering sensor (100) and the variance of the resources available in the sub region grid (1201) compared to the variance of the entire resources available for the wireless mesh network of sensors (1000) can influence the decision of the dynamic supervising-peer (1208). For example, given the wind condition, if a sensor (100) enters (1205) a sub region grid (1201) with a resources very similar to the one leaving (1206) the sub region grid (1201), then the supervising-peer (1208) might let the sensor (1206) to leave the sub-region grid (1201). The dynamic supervising-peer (1208) could be selected, for example, based on its location in the topology of the existing sensors (100) in the sub region grid (1201) and its available resources (power, memory, bandwidth). The dynamic supervising-peer (1208) can be connected directly or through the wireless mesh network of sensors (1000) to the other sensors (100) located anywhere inside the sub region grid (1201). Therefore, the supervising-peer (1208) could be dynamically changed if the previous supervising-peer (1208) passes the supervising-location and a new supervising-peer becomes close to the supervising-location (1208).

Additionally, The distributed control architecture (1200) can make sure that the sensors (100) inside a sub region grid (1201) can take a random turn to be a power and time consuming supervision-peer (1208) of the sub region grid (1201 to keep the total resources in the sub region grid (1201) balanced. The distributed control architecture (1200) could determine the supervising-location (1208) based on the previous experiences of the sensors (100) in the sub region grid (1201). Moreover, the sensors in a sub-region grid (1201), without a supervising-peer (1208), can negotiate with each other to decide if they should allow an outside sensor (100) to join them (1206) in the sub region grid (1201) or just pass by (1207). For example, the sensors in a sub-region grid (1201) might let an insider sensor (100) to leave (1205) the sub region grid (1201) for a neighboring sub region grid (1201). This way, it could be the responsibility of the sensor's (100) own internal controller (307) to either keep its position (1203) within a sub region grid (1201) or to move (1204) to a new designated sub region grid (1201). The controller (307) of a sensor (100) can take such decision by having access to the most updated resources and the topography of the existing the sensors (100) inside the sub region grid (1201), the condition of the wind, the number of sensors (100) inside the sub region grid (1201) which are about to leave (1205) and the number of sensors (100) which are about to enter (1206) the sub region grid (1201). Therefore, when a sensor (100) wants to make its decision, it could consider some percentage of probabilities for the current situation and if it is allowed to leave (1205) the sub region grid (1201) and enter the neighboring sub region grid (1201) or just pass by it.

In accordance with the example embodiments of the present disclosure, the wireless mesh network of spherical mobile sensors (1000) can use routing and low-power data handling protocols. Some examples of such protocols can be found in references [21] and [22], incorporated herein by reference in its entirety. The distributed control architecture of the wireless mesh network of sensors (1000) can dynamically reconfigure itself in order to optimize the performance of the entire sensor system (1000). The distributed control architecture can be able to do this while operating in any (combination) of the following three modes: (i) as a centralized distributed system where the decisions can be made by a centralized station, (ii) as a decentralized distributed system where the neighboring sensors (100) can negotiate with each other in order to make a decision, and (iii) as a solo system where each sensor (100) can decide individually what should be done based on the goals of the whole system and the way it could survive.

As illustrated in the example embodiment of FIG. 12, the distributed control architecture can based on two control commands; stop (1203) and keep-going (1204). The stop (1203) command can make a sensor (100) halt and anchor where it is, whereas the keep-going (1204) command can let the moving sensor (100) to continue along its wind-driven path. The area of interest can be divided into grids or sub region grid (1201). A sub region grid (1201) can be an unit of an area that could be covered by a cluster of sensors (100). Each grid could have the following characteristics: (i) a ranking weight value (RG) that represents the level of importance of the grid for the system's stakeholders (1202) (ii) the total number of sensors (100) (NG), (iii) the total available power (PG), (iv) the rate of energy generation (EG), (v) the available memory (MG), (vi) the available assigned bandwidth (BG) and (vi) available power, memory and bandwidth for each sensor (100) in the grid.

One goal of the distributed control architecture (1200), illustrated in the example embodiment of FIG. 12, can be to minimize the variance of the system resources available to each of the sensors (100) in each sub region grid (1201). In other words, distributed control architecture (1200) can make the sensors (100) in each grid (1201) to be more or less uniform depending on the resources available to them and to the priority ranking of their sub region grid (1201). The variance of the different mobile sensor (100) resources is an example of a quality-of-service (QoS) function of the system resources that the distributed control architecture (1200) may want to optimize. However, the invention disclosed herein is not limited to this particular (QoS) and, depending on the application, one could define different (QoS) functions. More generally, the quality of service (QoS), assigned to each sub region grid (1201) can be a function of the total resources available to it, and would be normalized by the ranking of the sub region grid (1201) (e.g. QoS(G)=F(PG,EG,MG,BG)/RG). The sensors (100) in each sub region grid (1201) can negotiate with each other to come up with a task plan that cam maximize the (QoS(G)). The sensors (100) in each sub region grid (1201) can negotiate with each other to decide if they should allow an outside sensor (100) to join them in the sub region grid (1201) or just pass by. They may also let an insider sensor (100) to leave the sub region grid (1201) to a neighboring grid. Such signal could be given to an entering sensor (100) based upon (QoS(G)). Another goal of the wireless mesh network of sensors (1000) could be to guarantee the uniformity of the (QoS) between different sub region grid (1201).

According to the example embodiments of the present disclosure, the initial spatial distribution of the mobile sensors (100) of the wireless mesh network of sensors (1000) can be determined by using the existing wind circulation models, wind pattern maps, and topography maps. By performing extensive simulations using those maps, the sensors (100) released in different locations can be traced to come up with the best configurations that could make the distribution of sensors (100) uniform across the sub region grid (1201). With a stable wind and topography system, the wireless mesh network of sensors (1000) could be able to rely on the wind circulation models and topography maps. In some cases, for example, in the Arctic, the surface topography of melting and freezing ice can change rapidly and unpredictably over seasonal changes which can make the existing topography model maps unreliable. As a result, the wireless mesh network of sensors (1000) might need to learn the wind vectors and the topography of the region from its own distributed sensors (100) across the area. By way of an example, a sensor (100) in the Arctic may know that the area which it is approaching is still covered by ice, since there were recently sensors (100) near the same location that reported the existence of ice in the area. Alternatively, a sensor (100) that is in a certain location can predict its near future location by referring to other sensors (100) that previously were there and with the same wind vector ended up to be in another location. The accuracy of an event's prediction (such as existence of ice in a location or where the sensor (100) might end up) is higher if: (i) the time that the event has occurred previously was not long ago, (ii) the location of the event occurred is not far away and (iii) the number of previous occurrences of the event and/or sensors (100) reporting the event were high. Therefore, the sensors (100) can constantly update the circulation patterns, topography, and importance/ranking of a region (based on the targets and events detected in the sub region grid (1201)), which could be used by the wireless mesh network of sensors (1000).

As illustrated in the example embodiment of FIG. 12, if a certain sub region grid (1201) needs to be covered and monitored by some sensors (100), the wireless mesh network of sensors (1000) might know what number of mobile sensors could be sufficient to satisfy and balance the stakeholder's monitoring expectations and limitations. Some of the expectations could include detecting certain events (e.g. change in the topography of the ice or detecting a certain pollutant) in a given period of time (e.g. less than 48 hours), or being able to lengthen the monitoring time of a certain event. Alternatively, when a target is detected, a sensor (100) might be asked to stop and monitor the event as long as it has enough power. In case, it goes almost out of power or memory, the sensor (100) can change shift with another passing sensor (100) with a full fresh battery and memory. If the stop and monitoring time is longer, more sensors (100) could be in the sub region grid (1201) to track the target.

According to the example embodiments of the present disclosure, a heads-up cooperation control strategy can be at the core of the distributed control strategy of the wireless mesh network of sensors (1000). The heads up cooperation strategy can comprise of passing a measurement or monitoring task of a sensor (100) that can no longer perform its task adequately to the next most suitable sensor (100), or alerting the sensors (100) regarding certain events that could happen in near future. Therefore, the sensors (100) which have received the heads up could be cautious about using their resources (e.g. memory, power) in anticipation of tasks they might have to perform in future. Additionally, intelligent autonomous task allocation algorithms can reassign tasks to each spherical mobile sensor (100) (either locally or globally) in response to changes in the system capabilities or changes in the mission objectives. This can make the wireless mesh network of spherical mobile sensors (1000) highly responsive and adaptable. As a result, the spherical mobile sensors (100) can distribute tasks, data, computations, etc., and can cooperate with each other in intelligent ways. For example, if several spherical mobile sensors (100) sense that there are other sensors (100) in close proximity to each other, then the sensors in close proximity to one another can communicate with each other and share tasks. For example, among the sensors in close proximity to one another, one could measure the local temperature, the other the local vapor content, etc., thereby saving power for the entire sensor system (1000) and reducing data traffic. On the other hand, if for some reason highly reliable data is required, the spherical mobile sensors (100) can fuse their measurements (for example, by averaging) and can send accurate measurements to the base stations.

Figure 13:
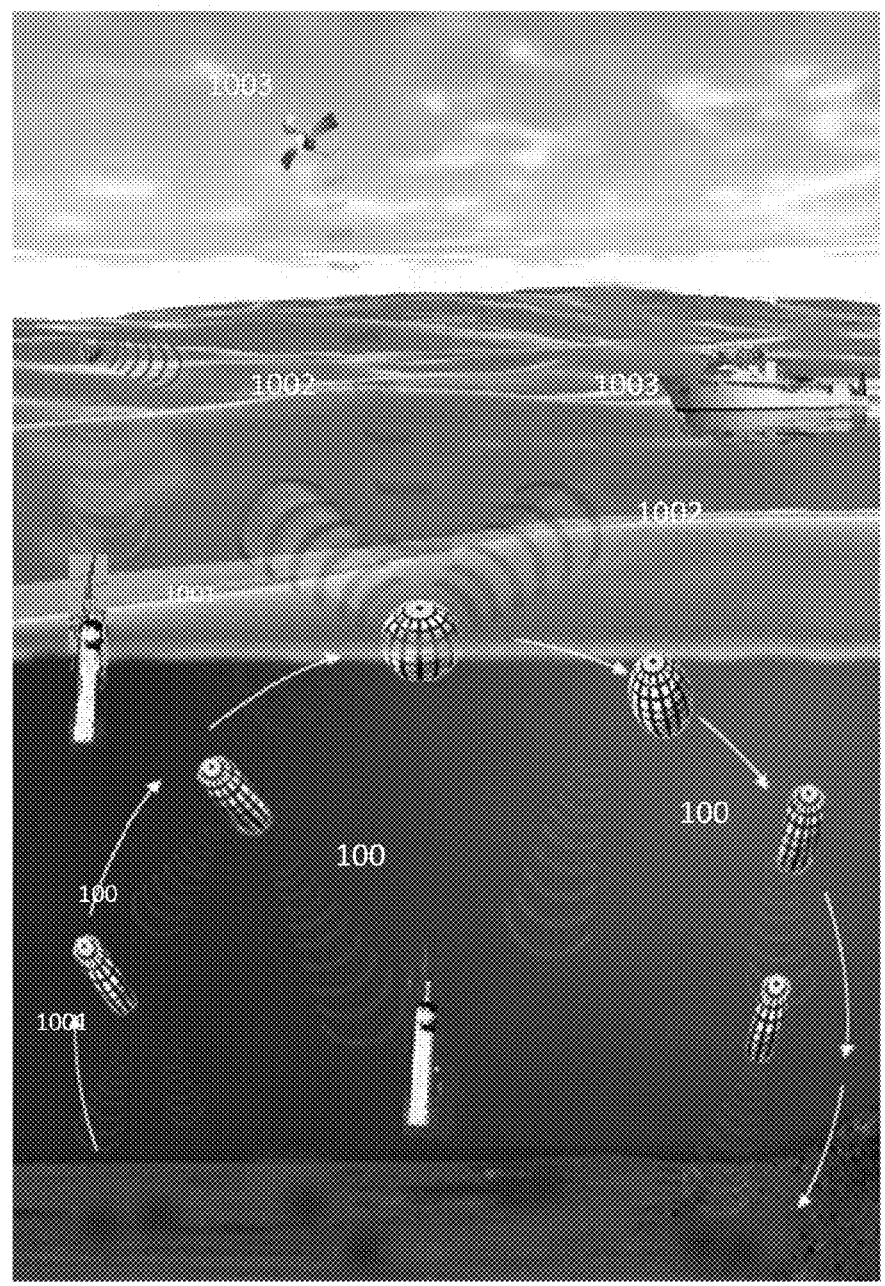
FIG. 13 shows an example embodiment of the distributed control architecture of the wireless mesh network of sensors in sea.

In accordance with the present disclose, the example embodiment of FIG. 13 illustrates another example embodiment of the distributed control architecture of the wireless mesh network of sensors (100) in sea. In case of the distributed control architecture of the example embodiment of FIG. 13, in order to operate correctly, it might be useful for the wireless mesh network of sensors (1000) to know the location of each sensor (100) at all times. For example, the wireless mesh network of sensors (1000) might need to know the location of a measurement taken by a sensor (100), or the coverage of a certain sub region grid (1201) by the sensors (100). In some embodiments of the distributed mesh network of sensors (100), GPS might be used to determine the location of the sensors (100). In the absence of GPS satellites, for example, in some parts of the Arctic, the sensors (100) can use a micro-gyroscope based on CMOS/MEMS technology to convey their location to the base station. The peer-to-peer (1001) communication link between the sensors (100) or between the sensors and the base stations (1003) can be used to measure the time of flight between (and hence the distance among) two sensors or between the sensors and the base station to perform a local autonomous triangulation and determine the position of the sensors (100).

Therefore, the position information along with the current wind patterns and information from the sensors (100) in the sub region grid (1201) can help the wireless mesh network of sensors (1000) to predict the location of each sensor (100) and create a dynamically modifiable map of each sensor (100) locations. The sensors (100) in the wireless mesh network of sensors (1000) can have some degree of self-awareness. For example, each sensor (100) might know how much battery power they have, how full their memory is and what kind of events and regions (1201) they are encountering, etc. As described previously, each sensor (100) in the wireless mesh network of sensors (1000) can be able to broadcast the status of their parameters (for example, battery power, available memory etc.) and events to their neighboring sensors (100) and the base stations (1003) to give them heads up if necessary. Therefore, the wireless mesh network of sensors (1000) can constantly update a global map of sensor (100) locations, along with the information about the available energy and memory resources of each sensor (100). This can facilitate the distribution of tasks, data, computations and cooperation between the sensors (100) in intelligent ways. Additionally, the wireless mesh network of sensors (1000) can be scalable since the software of each sensor (100) can be upgraded and/or additional sensors (100) can be introduced to the wireless mesh network of sensors (1000), as long as the same network protocol is used for the newly introduced sensor (100).

As mentioned previously, each sensor (100) in the wireless mesh network of sensors (1000) use the energy stored in its batteries to operate and perform various tasks. Since, energy stored in the batteries of each sensor can be harvested from ambient resources, the wireless mesh network of sensors (1000) could be more energy efficient. Each sensor (100) in the wireless mesh network of sensors (1000) can have sensing, processing and communication (e.g. integrated antenna and modems) capabilities. Therefore, in the wireless mesh network of sensors (1000) each sensor (100) can be configured to have peer-to-peer communications capabilities with other sensors (100) as well as communications capabilities with a base station (1003), ground vehicles, ships, aircraft or balloons, submarines, buoys, wireless networks in the area and orbiting satellites. Consequently, the sensor system (1000) can forward and relay messages, signals and commands among a communication network and therefore can create an intelligent network of task sharing in order to optimize the use of resources (power, memory, bandwidth, structure's endurance, etc.) for the entire wireless mesh network of sensors (1000). Additionally, by way of example and not of limitation, the wireless mesh network of sensors (1000) can detect and track a wide range of targets (e.g. oil or gas spillage; oil and gas reservoir; valuable minerals; pollutants; environmental factors; moving objects such as animals, humans, submarines, or ships around; etc.), clean up oil spillage, explode objects, listen to outside communications and send various acoustic or radar signals. In particular, the wireless mesh network of sensors (1000) can gather reliable data which can be used to draw more reliable inferences (for example, presence of some certain mineral, oil spillage, gas leakage, ice condition and topography in the polar regions, pollutants, fumes, temperature profiles etc.). The data gathered this way can be more reliable compared to other systems since the sensors (100) can aggregate their multiple measurements to obtain more accurate estimates (for example, by averaging their measurements).

According to the example embodiment of the present disclosure, the wireless mesh network of spherical mobile sensors (1000) can be robust since the wireless mesh network of sensors (1000) can function even if many individual sensors (100) stop operating. Any dis-functioning or broken individual sensors (100) can be replaced as required dependent on application/situation. Therefore, the wireless mesh network of sensors (1000) can be replenished with new sensors (100) if desired. Size, mass and shape of the each sensor (100) can depend on the environment in which it is released. Moreover, the wireless mesh network of sensors (1000) can be controlled from a base station and/or satellite, since the individual sensor's (100) movement and tasks can be controlled using its internal controller (307) where each sensor (100) can have peer-to-peer communication capabilities with other sensors (100) within the wireless mesh network of sensors (1000) and/or a base computer or satellite (1003). More in particular, as mention above, movement and tasks/activities of each individual sensor within the wireless mesh network of sensors (1000) can be controlled either through a local decision of that mobile sensor's controller, negotiation among neighboring individual mobile sensors or through a centralized command from a base computer or a satellite.

Figure 14:
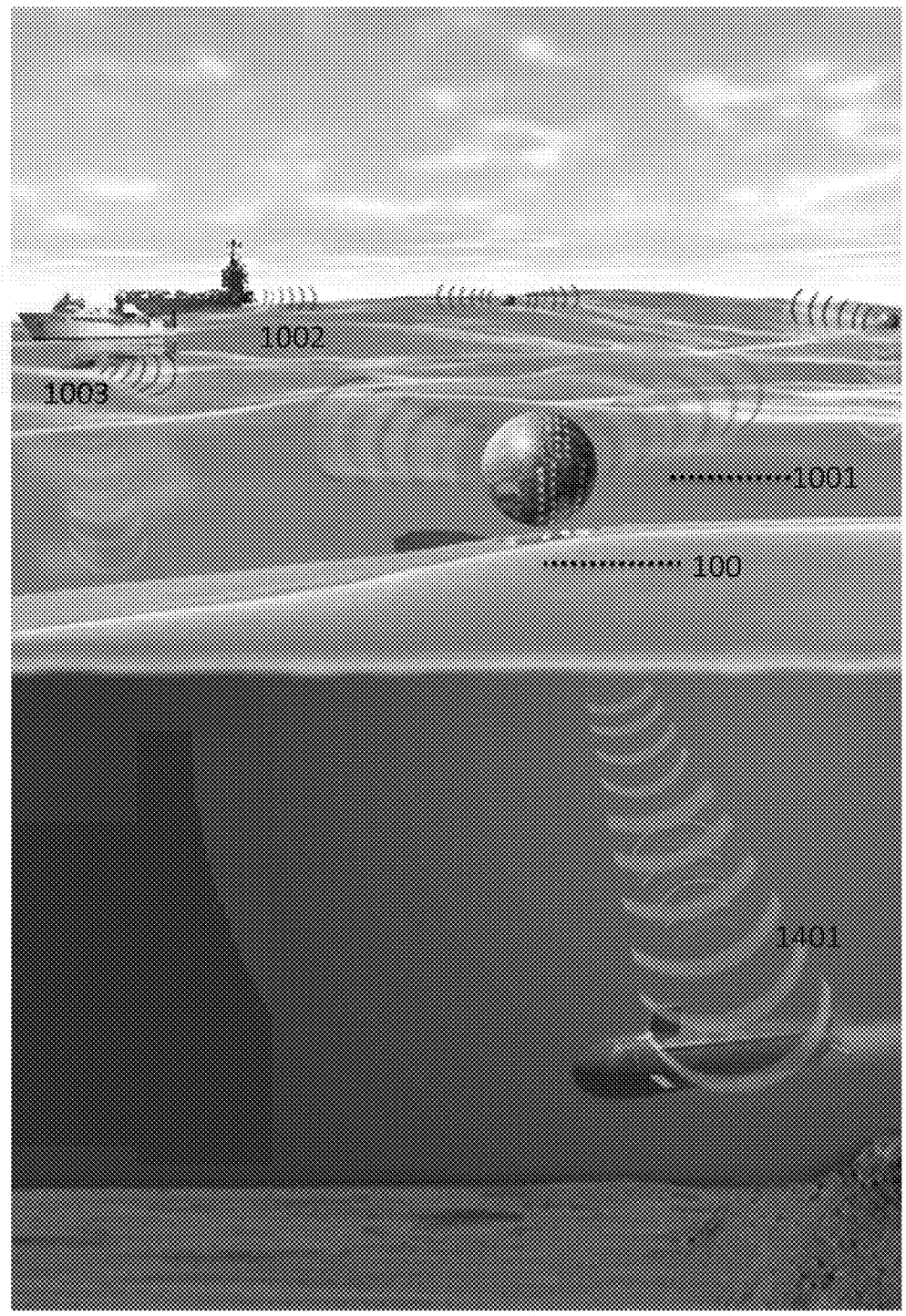
FIG. 14 shows deep sea and underwater communication between submarines, submarines and ships and submarines, satellites and aircraft as occurs in the open ocean using the wireless mesh network of sensors.

In accordance with the present disclosure, the example embodiment of FIG. 14 shows deep sea and underwater communication (1401) between submarines, submarines and ships and submarines, satellite and aircraft as occurs in the open ocean using wireless mesh network of sensors (1000). The deep sea and underwater communication (1401) between submarines, submarines and ships and submarines and aircraft as occurs in the open ocean can be a challenging problem. One reason for these challenges could be the high power consumption during these communications and relatively short range of available sonar signals (1401). Another reason could be the absence of any wide-range communication infrastructure which is capable of transferring data and information between the air transportable communication (ATAC) and down-link communication (DLC) as a means of communication between an aircraft and a submarine, or between a ship and a submarine. Various types of floating sensors (for example, Argo-floats and Sonobuoys) could have a short lifespan due to their need for heavy batteries to drive their locomotion and to transmit sonar communication signals that are perceptible by nearby ships and submarines. The example embodiments of the wireless mesh network of sensors (1000) illustrated in the present disclosure, can serve as the infrastructure that facilitates underwater communications (1401) between the base stations on the surface (1002), ships or submarines shipped to the area, and deep sea sensors.

As described earlier in this disclosure, the spherical mobile sensors (100) can have GPS and can determine their locations. They can float on the surface of the water and can move via wind or water-current. The torque generated by the spherical mobile sensor's (100) internal structure (by appropriately moving the internal movable weights) can also allow the spherical mobile sensor (100) to move on their own using their internal battery power. The sensors (100) can be anchored (and made somewhat stationary) by deflating them using rigidizable structures as previously presented or change the form of the structure of the sensors (100) from an complete sphere to more oval or cylinder shape, in order to make it descend in water; Since the speed of the wind on the open sea can be 12-20 m/s but the speed of the current is less than 0.5 m/s, therefore by moving the sensors (100) down in the water the speed of the sensor (100) can be reduced as it wouldn't be projected to the blowing wind. Conversely, when necessary, or when conditions are suitable (e.g. wind or water current is in the right direction), the sensors (100) could be inflated to get to the surface of the sea since while inflated the density of the sensor (100) would be less. The inflated sensor (100) can be subjected to the blowing wind and therefore the sensor (100) could resume its wind and/or water current-driven motion. As a result, similar to what has been described earlier in this disclosure, the motion of the sensors (100) can be controlled either through a local decision of the sensors (100) internal controller, through negotiation among the neighboring sensors (100), or through a centralized command from the base (1003). Based on the Ekeman's law, there exists an angle of 45 degree between the wind direction and the direction of the water currents on the wind. Additionally, based on Ekeman's maw, more the sensors (100) would sink in the water the direction of the sensors (100) will change until about 100 m, where the current's direction would be almost the opposite direction from the wind. The distributed control architecture (1200) can use this principle to control the direction and the speed of the sensors (100) and their distribution in the sub region grid (2001).

According to the example embodiments of the present disclosure, the spherical mobile sensors (100) can also survey the weather and water conditions on the surface of the sea. Since the sensors (100) can have sensing, as well as transmission and reception capabilities (both sonar and RF), the spherical mobile sensors (100) can receive sonar signals and transmit them. The sensors (100) can have RF peer-to-peer communications capabilities with other spherical mobile sensors (100), as well as with ships, permanent bases and orbiting satellites. Therefore the spherical mobile sensors (100) can "forward and relay" messages, signals and commands from submarines and deep sea sensors (1401) to and from the base, ships, other submarines and other spherical mobile sensors (100).

A water pump can be provided in the spherical mobile sensor (100) in order to pump water inside the inner layer (102). Once pumped with water, the spherical mobile sensor (100) gets heavier and can sink under the water surface. The outer layer (101) can be made out of a smart material, such as that described in reference [24] (incorporated herein by reference in its entirety) in order to help the spherical mobile sensor (100) swim upwards or downwards faster, and can help the spherical mobile sensor (100) back to the surface again. In order to make the spherical mobile sensor (100) swim, the outer layer (101) can be of made of ETFE (or other known and appropriate polymers), which is flexible and strong. As described in reference [24], little wires, which can be referred to as shape memory alloy composites, could be laminated inside the outer layer (101). The outer layer (101) can be peeled into one or more pieces (analogous to peeling an orange or a banana) when the spherical mobile sensor (100) is deeper in the water, where one end of each piece of the peeled outer layer (101) can be connected to the internal skeleton (105) and inner skin (103). In such case, the inner layer (102) can stay filled with water in order to make the inner and outer pressure equal, so movement of the spherical mobile sensor (100) is possible and structure of the spherical mobile sensor (100) can avoid getting crushed under the pressure of the deep sea. Then the one or more pieces of the outer layer (102) can use motions as suggested in reference [24] in order to swim up to the surface. As mentioned, in reference [24], the power for the spherical mobile sensor (100) can be generated from heat-producing chemical reactions between oxygen and hydrogen with platinum coated on the surface on the outer layer (101). Therefore, the mechanism can be self sufficient in terms of energy. When the spherical mobile sensor (100) swims to the surface again, the spherical mobile sensor (100) can use the water pump in order to extract the water inside of the inner layer (102). This extraction of water will decrease the weight of the spherical mobile sensor (100) such that the spherical mobile sensor (100) can be blown by the wind on top of the surface of the water or carried by water currents. In order to keep the electronics in the spherical mobile sensor (100) safe when the spherical mobile sensor (100) goes deep in the water, the batteries and other electronics can safely be protected in the central region (705) of the spherical mobile sensor (100) by constructing the central region (705) using strong metals or polymers like steel.

As shown in the example embodiment of FIG. 14, the spherical mobile sensors (100) can able to send active sonars (1401) to detect foreign submarines. The sensors (100) can form a wireless mesh network of sensors (1000) whose components are able to work intelligently together in order to detect and track of foreign submarines. The wireless mesh network of sensors (1000) could assist in search and rescue missions as well. The spherical mobile sensors (100) can be able to send more low-power acoustic signals with a shorter wavelength, since the other spherical mobile sensors (100) of the wireless mesh network of sensors (1000) in the region would be able to detect them. Furthermore, the signal processing of the returned distributed acoustic signals could be done at the base station (1002) (ships, submarines or satellites missioned to the region) which can relieve the sensor (100)

from the power-consuming computations. Alternatively, the sensors (100) could share the signal processing computations among themselves, so that each sensor (100) need less energy for the computations. Therefore, the cost can be significantly lower than that of the current sonar buoys with heavy batteries and signal processing done in a single buoy.

Figure 15:
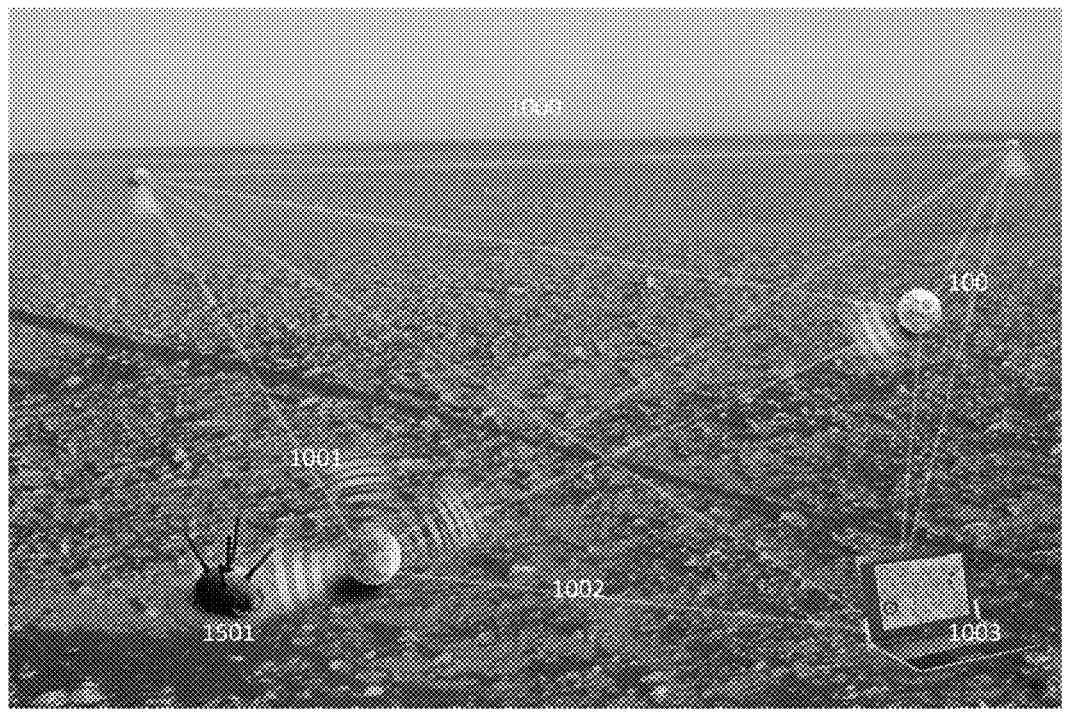
FIG. 15 shows an application of the wireless mesh network of sensors in detecting land mines.

In accordance with the present disclosure, FIG. 15 shows an application of the wireless mesh network of sensors (1000) in detecting land mines. The wireless mesh network of sensors (1000) can be used as a self-powered distributed wireless network of landmine (1501), detecting sensors that could last several months or years with the ability to dynamically reconfigure and relocate themselves using the wind-propelled motion strategy and the mechanical control design that has been described earlier in this disclosure. The wireless mesh network of sensors (1000) could be deployed in an area of interest where they scan the area thoroughly, detect and locate the landmines (1501) in the area, update a collective map of the detected landmine in the area created by the wireless mesh network of sensors (1000) and report the updated map back to the base stations (1003) in real time. The landmine detecting spherical mobile sensors (100) illustrated in FIG. 15 could be equipped with an array of passive and active sensors (metal detectors, explosive sniffers, nuclear reaction techniques, acoustic sensors, etc. some of them previously mentioned) to detect different kinds of landmines (1501). The sensors (100) used for detecting landmines (1501) could have a GPS to report the status (landmine or clear) and the location of the area they have scanned, to the base station (1003).

As illustrated in the example embodiment of FIG. 15, the landmine detection application can map the areas of interest and can introduce a fast, safe, and cost-effective way of landmine detection. The distributed control architecture (1200) of the wireless mesh network of sensors (1000) can force the sensors (100) to take advantage of their internal control mechanism (303) and the local wind to scan the area of interest thoroughly with a high resolution. Based on the standards of the United Nations for the humanitarian demining, 99.6% resolution is recommended to consider an area to be clear of landmines. Therefore, the distributed control architecture (1200) of the wireless mesh network of sensors (1000) can control the movement of the spherical mobile sensors (100) to stop in an uncovered area, called stop-point, and scan the uncovered surrounding area with a high resolution by rolling thoroughly around the stop-point. In the present disclosure, an "uncovered area" can be defined as an area of land where no spherical mobile sensors (100) has already passed and examined to detect a possible landmine (1501).

The distributed nature of the wireless mesh network of sensors (1000) can help to cross-reference the data and can report back more reliable data. The data collected this way could be considered more reliable since the data from multiple sensors (100) scanning the location could be averaged in real time to update the information of that area in the wireless mesh network of sensors (1000). The distributed control architecture (1200) of wireless mesh network of sensors (1000) can update the map of the area in real time with the information collected about the area by each sensor (100). Moreover, the distributed control architecture (1200) can update the information regarding each sensors resources and location along with the map of their topology. This information can be broadcasted to the entire wireless mesh network of sensors (1000) in order to optimize the coverage of the area of the interest with the required resolution. For example, if a spherical mobile sensor (100) is in a location and with the current wind, it could end up in an area that was already scanned by the other sensors (100), then that spherical mobile sensor (100) might decide to stop (1203) and wait for a desired wind that could take it to some other area which wasn't scanned by other sensors (100) yet. The landmine detection application of the wireless mesh network of sensors (1000) could allow mapping of an area of interest at a much faster pace and in a more cost-effective fashion. The sensors (100) can work continuously to ensure that the entire area of interest is fully scanned before heading to a new area. The wireless mesh network of sensors (1000) can make the task of detecting the landmines, which is a risky and dangerous job, much safer. With an accurate map of the landmines (1501) created by the wireless mesh network of sensors (1000), the professionals can perform different techniques to destroy or deactivate the mines.

For scanning and mapping the landmine fields, the spherical mobile sensor (100) can be built with a very low density (for example, 1-2 kilogram in mass and at least 1 meter height) light materials to ensure that the weight of the sensors wouldn't explode the mines. Some examples of such materials and design of spherical mobile sensors (100) have been discussed in the previous sections. Lighter sensors can ensure the safe detection of landmines using wireless mesh network of sensors (1000). The information gathered this way could be used to map the safe areas in that particular region which is without any landmines. The detected landmines in the area can be deactivated or exploded safely by the experts in a later time. With an accurate map of the landmines (1501) created by the wireless mesh network of sensors (1000), the professionals can perform different techniques to destroy or deactivate the mines. The wireless mesh network of sensors (1000) can be useful in flat regions and deserts of the middle-east or African countries where there is an abundance of high speed winds and strong sun light throughout the year. Using the harvested energy thorough the solar cells and/or other energy harvesting tolls attached to each sensor (100), the wireless mesh network of sensors (1000) could be a self-powered system that could stay active and perform various tasks for long time. Alternatively, the spherical mobile sensors (100) could be built heavier (more than 10 kg) with higher density to explode the landmines if required. For example, kevlar or similar materials that are highly temperature and tensile resistant could be used to build the spherical mobile sensor (100) to survive such explosions. The distributed control architecture (1200) of wireless mesh network of sensors (1000) and the control mechanism (303) of each spherical mobile sensor (100) in the network of sensors (1000) can ensure the coverage of the entire area of interest.

Figure 16:
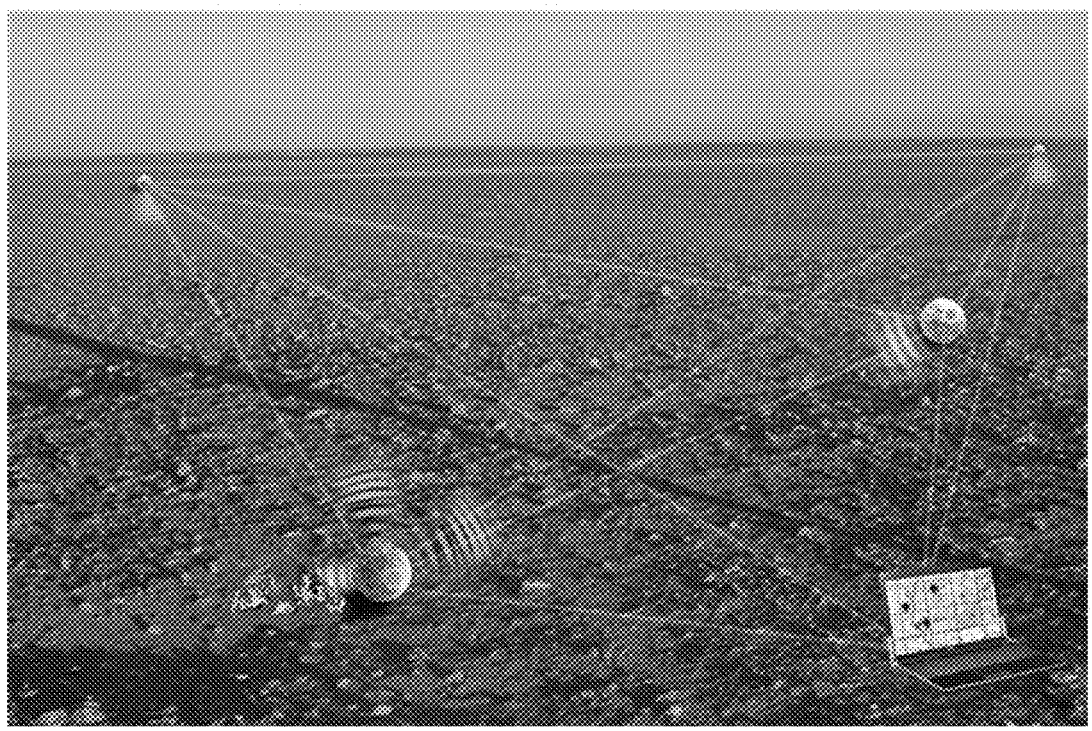
FIG. 16 shows an application of the wireless mesh network of sensors in detecting and mapping various minerals and materials in an area of interest.

In accordance with the present disclosure, the example embodiment of FIG. 16 shows an application of the wireless mesh network of sensors in detecting and mapping various minerals and materials in an area of interest. The wireless mesh network of sensors (1000) could be able to detect and map various minerals and materials in an area of interest. The spherical mobile sensors (100) in a network of sensors (1000) can use various spectrometers, imagers, GPS, and micro instruments to scan an area of interest and therefore, detect, locate, and map various minerals and compositions that might be of interest of the stakeholders of the system. Some of the instruments that could be used by the spherical mobile sensors (100) in this purpose are: gamma spectrometers, multi-spectral microscopic imager, alpha particle X-ray spectrometer, Raman spectrometer with a VLOK microchip laser integrated within a Raman probe-head, miniature mass spectrometer (MMS), MEMS gas chromatography sensors, different MEMs gas detectors, etc. Some example of such instruments could be found in references [14]-[18], incorporated herein by reference in its entirety. The wireless mesh network of sensors (1000) could be used in large deserts or flat regions with the potential of undiscovered minerals, rocks, or composite materials of interest. Most desert regions on the Earth which are approximately ⅓ of Earth's land surface [19], are windy and sunny, which could be utilized for the mobility and energy harvesting of the spherical mobile sensors (100). As mentioned previously, the distributed control architecture (1200) of the wireless mesh network of sensors (1000) and the internal control mechanism (303) of each spherical mobile sensor (100) can ensure an complete coverage of the area of interest with the desired resolution.

In accordance with the various embodiments of the present disclosure, the wireless mesh network of sensors (1000) could be able to detect and map any leakage of the natural gas or oil in the gas and oil exploration and drilling sites. The wireless mesh network of sensors (1000) could be used in order to find the in-situ signatures that might help to explore natural gas or oil reservoirs. Various spectrometers, sensors, micro devices, and tools could be integrated in the spherical mobile sensors (100) of the wireless mesh network of sensors (1000) to detect various in-situ signatures of the oil and natural gas reservoirs, or petroleum and natural gas leakage on land (for example, deserts, Antarctica), oceans, open sea and ice (for example, polar regions, tundra, Arctic, Antarctica). For example, gamma spectrometers, multispectral microscopic imager, alpha particle X-ray spectrometer, Raman spectrometer with a VLOK microchip laser integrated within a Raman probe-head, miniature mass spectrometer (MMS), MEMS gas chromatography sensors, different MEMs gas detectors, etc. Some example of such sensors could be found in references [14]-[18] and [21], incorporated herein by reference in their entirety.

Another application of the wireless mesh network of sensors (1000) could be for measuring various important factors such as air temperature and/or humidity, soil temperature and/or moisture, atmospheric pressure, solar radiation, ultraviolet radiation, wind vane, luminosity, anemometer, pluviometer for autonomously monitoring the large agricultural lands for agricultural purposes. Some example of such sensors could be found in reference [21], incorporated herein by reference in its entirety. The wireless mesh network of sensors (1000) and its distributed control architecture (1200) could be able to perform the above mentioned tasks for monitoring the agricultural lands in the same manner discussed in the context of FIGS. 10, 11, 12, 15, and 16. Moreover, the wireless mesh network of sensors (1000) could also be used to disseminate or spread various materials, or chemicals on the flat agricultural lands (for example, fertilizers, pesticide, seeds etc.). This might be done by placing the chemicals or materials in the one or more tubular rings (302) and disseminator canisters (206) of each sensor (100) from the network of sensors (100), where the controllable valve attached to the canisters might help to spread their contents in the desired area.

According to the example embodiments of the present disclosure, the wireless mesh network of sensors (1000) could be used for autonomous monitoring of vast and/or remote lands (for example, the deserts or the polar regions) to detect and measure earthquake. By integrating gyroscope and accelerometer, for example, MEMS inertial measurement unit (3-axis gyro/accelerometer/magnetic) in the sensors (100), the vibrations and movements of the sensors (100) could be detected. Therefore, if any particular pattern in the signals is detected which could represent an earthquake in the area, the strength of the earthquake could be recognized. An example of such process using iphones could be found in reference [22], incorporated herein by reference in its entirety.

Figure 17:
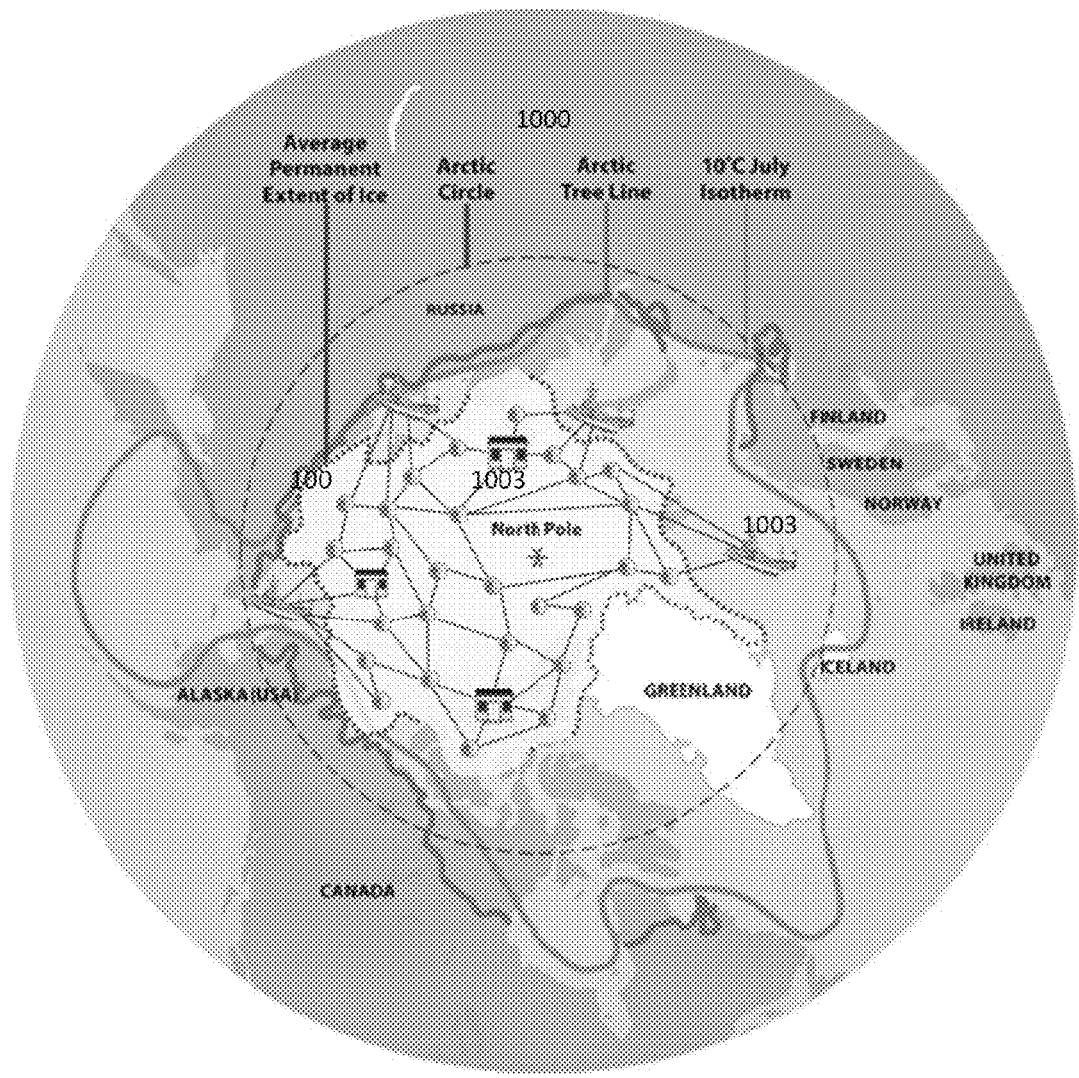
FIGS. 17-18 show application of wireless mesh network of sensors in monitoring land, ice and maritime of the Arctic.
Figure 18:
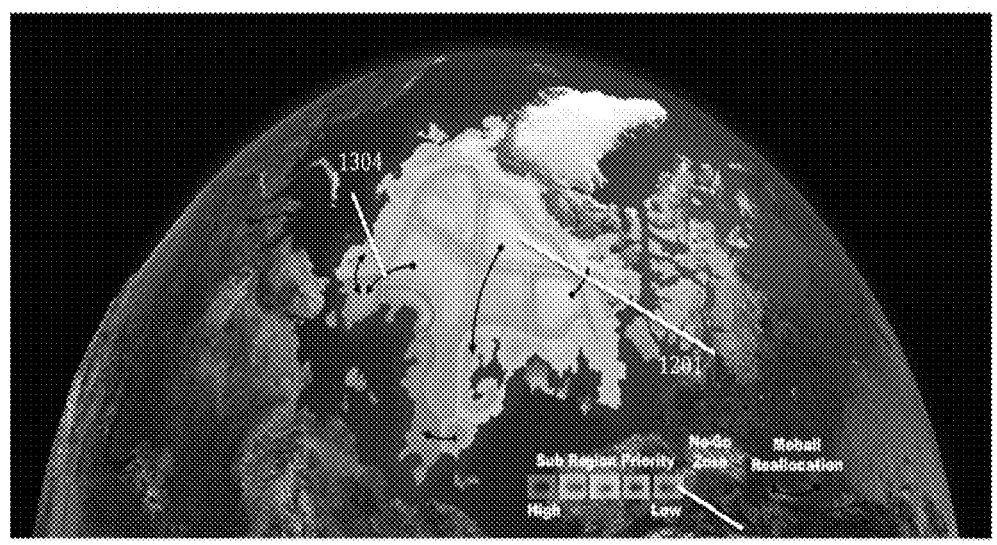

FIGS. 17-18 shows an application of the wireless mesh network of sensors (1000) in monitoring land, ice and maritime of the Arctic. Recent observations of the Arctic have shown that the sea ice is melting at an alarming rate. In the past decade, the Arctic sea ice cover has been shifted from a regime dominated by thick and stable (multi-year) perennial ice to one dominated by thin and weak (first-year) seasonal ice. Current sensing and measurement capabilities lack the time-responsiveness, accuracy, and spatial coverage required to effectively quantify each contributing factor to the above phenomena and to identify other missing factors. These capabilities are critical to improve seasonal-to-decadal prediction models across local, regional, and global scales for science research as well as stakeholders' applications. Lacking reliable ice topography, water, and weather condition maps especially pose great risks on the marine transportation vessels passing through the Arctic when the ice is partially melting and the safest and the shortest path and time to travel is vital for safe navigation.

The Arctic monitoring application of the wireless mesh network sensors (1000), as shown in FIGS. 17-18, can be equipped with an array of low-power and low-mass sensors, and micro devices able to measure a wide range of environmental factors such as the ice conditions (ice class, ice thickness, ice temperature, snow depth, etc.), chemical species (carbon dioxide, bromine monoxide, ozone, gaseous elementary mercury, etc.), wind vector patterns, cloud coverage, air temperature and pressure, electromagnetic fields, surface and subsurface water conditions, short- and long-wave radiations, bathymetry, and other secondary factors such as human presence and activity. The wireless mesh network of sensors (1000) can have the power to observe those constantly changing conditions in real-time, providing the basic capability required to update the ice topography and the weather patterns, which are the root of the existing predictive climate models. The distributed nature of the wireless mesh network of sensors (1000) can instantly map those environmental parameters over an entire region (1201) to reliably assess their value by cross-referencing readings from multiple nearby spherical mobile sensors (100), and to continuously update those maps. The widely and uniformly spread number of spherical mobile sensors (100), their peer-to-peer communications (1001) and their communication capabilities with the ground-based and sea-based stations (1002), and orbiting satellites would comprise a wireless mesh network (1001) that provides an interface for a global distributed control architecture that will ensure an Arctic-wide coverage, optimizing mobile sensor (100) monitoring efforts according to their available resources and the priority (1202) of local areas (1201) of high interest within the Arctic region. The system (1000) provides near real time ice topography and weather condition maps of the entire Arctic. Considering the melting ice and increasing maritime transportation in the region, and the fact that the Arctic is becoming the shortest and most economical way of transiting goods from the Atlantic to the Pacific this is of great importance. In this application, the system (1000) could also be used as an Arctic-wide wireless infrastructure for passing maritime vessels to transfer data and communicate with base-stations (1003). The system (1000) could also be used for search and rescue missions.

Another application of the wireless mesh network of sensors (1000) can be in the discovery of oil and gas discovery and oil spillage detection and clean-up in the Arctic. A geological survey performed in United States in 2008 estimates that the areas north of the Arctic circle can have 90 billion barrels of undiscovered, technically recoverable oil (and 44 billion barrels of natural gas liquids) in 25 geologically defined areas. This represents 13% of the undiscovered oil in the world. However, the extremely harsh arctic environment can hamper the exploration missions, spillage discoveries, estimations, and recoveries and can make it very difficult, risky, and costly. Furthermore, due to the lack of a reliable weather, ice, and sea condition forecast, monitoring and alerting system in the area, the safety of drilling operations, oil transportations, and marine transits is at risk. In addition, when drilling into the ice, it is important to monitor the ice condition around and in the wider surroundings of the site to make sure that it would not cause any major ice breakage and oil leakage. Such unanticipated ice flows and ice cracks heading towards the exploration and drilling sites are a major threat for the safe operation and safety of the personnel. The land, ice and maritime monitoring system of the Arctic, which can use of the wireless mesh network of sensors (1000) addresses all the above concerns.

As mentioned above, the spherical mobile sensors (100) could be equipped with an array of low-power low-mass sensors and micro devices able to measure a wide range of environmental factors such as the ice conditions (ice class, ice thickness, ice temperature, snow depth, etc.), water condition, cloud coverage, air temperature and pressure, wind vector patterns which are all of great interest to any oil and gas activity. In addition, the spherical mobile sensor (100) (especially in the North Slope) could carry a variety of sensors and spectrometers to autonomously scan, detect and map the oil and gas reservoir signatures (e.g. hydrocarbon-bearing materials, pure oil and oil-impacted soils and natural gas) in a wide area and report the constantly updated map with the most promising sites for successful oil and gas drilling back to the base stations (1003). The wireless mesh network of sensors (1000) can be able to monitor and map any leakage and spillage such as base fluids (e.g. diesel, mineral oil, synthetic fluid, etc.), petroleum oil-based muds (OBM's) (crude oil & natural gas condensate), seepage (including observations less than one barrel), spill events (with total spillage of 50 barrels or more), passive spills (unseen spills based on inventories of products lost from destroyed structures which are thoroughly dispersed during the storms) in the area.

The structure of the spherical mobile sensor (100) can be customized to carry and spread bioremediation in the case of possible oil spillage on the shoreline which uses naturally-occurring bacteria to "eat" oil. In the case of spillage, they can also spread chemical dispersants in the area to break down oil in water into small droplets. They spherical mobile sensors (100) thereby enhance and accelerate natural dispersion which makes the oil more available for natural biodegradation. In a different embodiment, an alternative strategy could be to make the entire mobile sensor (100) structure out of inert materials such as sorbents which are able to remove oil either by adsorption (the oil adheres to the surface of the material) or by absorption (the oil penetrates the pores of the material and is trapped inside). In either form, water passes through or is repelled by the material.

All patents and publications mentioned in the specification may be indicative of the levels of skill of those skilled in the art to which the disclosure pertains. All references cited in this disclosure are incorporated by reference to the same extent as if each reference had been incorporated by reference in its entirety individually.

The examples set forth above are provided to give those of ordinary skill in the art a complete disclosure and description of how to make and use the embodiments of the autonomous and controllable systems of sensors and methods of using such systems of the disclosure, and are not intended to limit the scope of what the inventors regard as their disclosure.

Modifications of the above-described modes for carrying out the disclosure may be used by persons of skill in the art, and are intended to be within the scope of the following claims.

It is to be understood that the disclosure is not limited to particular methods or systems, which can, of course, vary. It is also to be understood that the terminology used herein is for the purpose of describing particular embodiments only, and is not intended to be limiting. As used in this specification and the appended claims, the singular forms "a", "an", and "the" include plural referents unless the content clearly dictates otherwise. Unless defined otherwise, all technical and scientific terms used herein have the same meaning as commonly understood by one of ordinary skill in the art to which the disclosure pertains.

A number of embodiments of the disclosure have been described. Nevertheless, it will be understood that various modifications may be made without departing from the spirit and scope of the present disclosure. Accordingly, other embodiments are within the scope of the following claims.

REFERENCES

[1] B. Joyce, "Development of an Electromagnetic Energy Harvester for Monitoring Wind Turbine Blades." MS Thesis. Virginia Polytechnic Institute and State University. Dec. 12, 2011. World wide website scholar.lib.vt.edu/theses/available/etd-12202011-195538/unrestricted/Joyce_BS_T_2011.pdf. URL verified on Feb. 25, 2013.

[2] World wide website techon.nikkeibp.co.jp/english/NEWS_EN/20130206/264517/. URL verified on Feb. 25, 2013.

[3] K. Najafi, T. Galchev, E. E. Aktakka, R. L. Peterson, J. McCullagh, "Microsystems for Energy Harvesting," Invited Paper, 16*th International Conference on Solid-State Sensors, Actuators, and Microsystems (IEEE Transducers)*, Beijing China, pp. 1845-1850, June 2011

[4] World wide website libelium.com/documentation/waspmote/waspmote-datasheet_eng.pdf. URL verified on Feb. 25, 2013.

[5] World wide website machinedesign.com/article/metal-faced-inductive-sensors-for-durability-1106. URL verified on Feb. 25, 2013.

[6] World wide website gs.flir.com/products/icx-detection/explosives/fido-onboard/. URL verified on Feb. 25, 2013.

[7] World wide website Synkera.com. URL verified on Feb. 25, 2013.

[8] World wide website vectomay.com. URL verified on Feb. 25, 2013.

[9] World wide website microdevices.jpl.nasa.gov/capabilities/superconducting-devices/tes-bolometers.php. URL verified on Feb. 25, 2013.

[10] World wide website pdfdownload.org/pdf2html/view_online.php?url=http%3A%2F%2Fcensam.mit.edu%2Fnews%2Fposters%2F2010%2Fnorford %2F4.pdf. URL verified on Feb. 25, 2013.

[11] World wide website cs.gsu.edu/yli/teaching/Fall10/sensor/Slides/rp.pdf. URL verified on Feb. 25, 2013.

[12] World wide website cs.gsu.edu/yli/teaching/Fall10/sensor/Slides/rp.pdf. URL verified on Feb. 25, 2013.

[13] World wide website ncbi.nlm.nih.gov/pubmed/11030581. URL verified on Feb. 25, 2013.

[14] World wide website ortec-online.com/Solutions/gamma-spectroscopy.aspx. URL verified on Feb. 25, 2013.

[15] J. I. Nuñez, J. D. Farmer, R. G. Sellar, and P. B. Gardner, "The Multispectral Microscopic Imager (MMI) with Improved Spectral Range and Resolution" 40*th Lunar and Planetary Science Conference*. 2009.
[16] World wide website msl-scicorner.jpl.nasa.gov/Instruments/APXS/. URL verified on Feb. 25, 2013.
[17] World wide website instrumentsystems.jpl.nasa.gov/docs/MDL_AR09_041310.pdf. URL verified on Feb. 25, 2013.
[18] M. P. Sinha, E. L. Neidholdt, J. Hurowitz, W. Sturhahn, B. Beard, M. H. Hecht "Laser ablation-miniature mass spectrometer for elemental and isotopic analysis of rocks." *Rev Sci Instrum*. September. 2011. 82(9).
[19] World wide website geology.com/records/largest-desert.shtml. URL verified on Feb. 25, 2013.
[20] P. Harrington, A. Silliman, "Relationship between Reservoir Quality and Hydrocarbon Signatures Measured at the Surface" Search and Discovery Article #41078 (2012). Posted Nov. 26, 2012.
[21] World wide website cs.gsu.edu/yli/teaching/Fall10/sensor/Slides/rp.pdf. URL verified on Feb. 25, 2013.
[22] World wide website libelium.com/products/waspmote/sensors. URL verified on Feb. 25, 2013.
[23] World wide website ishakeberkeley.appspot.com/. URL verified on Feb. 25, 2013.
[24] World wide website iopscience.iop.org/0964-1726/21/4/045013. URL verified on Feb. 25, 2013.

The invention claimed is:

1. A sensor system comprising a plurality of unit sensors, each unit sensor comprising:
   an inner enclosure;
   an outer enclosure enclosing the inner enclosure, the outer enclosure including at least one sensing device and a controlling device; and
   a first elastic layer between an outer surface of the inner enclosure and an inner surface of the outer enclosure, wherein
   each unit sensor is configured to communicate with other unit sensors within the sensor system; and
   the plurality of unit sensors in the sensor system form a network of sensors.

2. The sensor system of claim 1, wherein each unit sensor is configured to communicate with a base station or a satellite.

3. The sensor system of claim 2, wherein each unit sensor is configured to exchange information, warning signs and command signals from the base station or a satellite.

4. The sensor system of claim 2, wherein each unit sensor is configured to be controlled by a command signal received by the controlling device from the base station or satellite.

5. A method of using the sensor system of claim 2 for detecting landmines or surface-mines, the method comprising:
   deploying the plurality of unit sensors in an area of interest;
   scanning the area of interest using the plurality of unit sensors deployed in the area of interest;
   mapping land mine or surface-mine location in the area of interest by communication between said unit sensors in the area; and
   sending a map of the landmine or surface-mine location to the base station or satellite.

6. The method of claim 5, wherein the plurality of unit sensors is configured to explode the landmines or the surface-mines.

7. A method of using the sensor system of claim 2 for monitoring agricultural lands, the method comprising:
   deploying the plurality of unit sensors in an area of interest;
   measuring one or more of air temperature, humidity, soil temperature, moisture in soil, atmospheric pressure, solar radiation, ultraviolet radiation, wind vane, luminosity, anemometer, and pluviometer, using at least one sensing device at the outer enclosure, thus acquiring one or more measurements; and
   sending the one or more measurements to said unit sensors in the area of interest and to the base station or satellite.

8. A method of using the sensor system of claim 2 for detecting minerals, the method comprising:
   deploying the plurality of unit sensors in an area of interest;
   scanning the area of interest using the plurality of unit sensors deployed in the area of interest;
   mapping minerals location in the area of interest by communication between said unit sensors in the area; and
   sending a map of the minerals location to the base station or satellite.

9. A method of using the sensor system of claim 2 for detecting gas leakage, the method comprising:
   deploying the plurality of unit sensors in an area of interest;
   scanning the area of interest using the plurality of unit sensors deployed in the area of interest;
   mapping gas leakage location in the area of interest by communication between said unit sensors in the area; and
   sending a map of the gas leakage location to the base station or satellite.

10. A method of using the sensor system of claim 2 for detecting chemical pollutant on sea, the method comprising:
    deploying the plurality of unit sensors in an area of interest at sea;
    scanning the area of interest using the plurality of unit sensors deployed in the area of interest;
    mapping chemical pollutant location in the area of interest by communication between said unit sensors in the area; and
    sending a map of the chemical pollutant location to the base station or satellite.

11. A method of using the sensor system of claim 2 for detecting topography of ice in an arctic region, the method comprising:
    deploying the plurality of unit sensors in an area of interest at the Arctic region;
    scanning the area of interest using the plurality of unit sensors deployed in the area of interest;
    mapping ice topography in the area of interest in the Arctic region by communication between said unit sensors in the area; and
    sending a map of the ice topography to the base station or satellite.

12. A method of using the sensor system of claim 2 for weather conditions in an arctic region, the method comprising:
    deploying the plurality of unit sensors in an area of interest;
    measuring at least one of air temperature, humidity, ice temperature, atmospheric pressure, solar radiation, and ultraviolet radiation, using at least one sensing device at the outer enclosure, thus obtaining one or more measurements; and
    sending the one or more measurements to said unit sensors in the area and to the base station or satellite.

13. A method of using the sensor system of claim 2 for detecting earthquakes, the method comprising:
    deploying the plurality of unit sensors in an area of interest;
    measuring vibrations of the sensors, using at least one sensing device at the outer enclosure;
    generating a pattern of vibration by communication between said unit sensors in the area;
    sending the pattern of vibration to the base station or satellite; and comparing the pattern of vibration with other patterns of vibration saved in the base station of satellite indicating earthquake.

14. The sensor system of claim 1, wherein the outer enclosure of each unit sensor further comprises at least one energy harvesting tool and at least one internal source of power.

15. The sensor system of claim 14, wherein the at least one energy harvesting tool is configured to harvest energy from ambient resources and store the harvested energy in the at least one internal source of power.

16. The sensor system of claim 14, wherein the at least one energy harvesting tool is a solar cell.

17. The sensor system of claim 14, wherein the at least one internal source of power is a battery and/or a capacitor.

18. The sensor system of claim 17, wherein the battery is a thin film lithium ion battery.

19. The sensor system of claim 1, wherein the at least one sensing device is selected from the group consisting of: MEMS, CMOS panoramic imager, alpha particle X-ray spectrometer, and Raman spectrometer.

20. The sensor system of claim 1, wherein the controlling device in each unit sensor is configured to control movement, communication and energy harvesting of each said unit sensor.

21. The sensor system of claim 1, wherein each said unit sensor further comprises a second elastic layer between an outer surface of the first elastic layer and the inner surface of the outer enclosure.

22. The sensor system of claim 21, wherein the second elastic layer comprises the controlling device, at least one sensing device, at least one energy harvesting tool and at least one internal source of power.

23. The sensor system of claim 21, wherein the second elastic layer further comprises at least one GPS device.

24. The sensor system of claim 21, wherein the second elastic layer is made of elastomer polymer.

25. The sensor system of claim 24, wherein the elastomer polymer is selected from the group consisting of: TRYMER® 1800, metallic micro-lattices and aerogel.

26. The sensor system of claim 1, wherein each said unit sensor further comprises one or more tubular rings encircling the inner enclosure, the one or more tubular rings comprising at least one pair of canisters.

27. The sensor system of claim 26, wherein the one or more tubular rings encircling the inner enclosure is made of ETFE covered by polyurea resin.

28. The sensor system of claim 26, wherein a first canister of the at least one pair of canisters is configured to carry isoyanates and a second canister of the at least one pair of canisters is configured to carry polyols.

29. The sensor system of claim 1, wherein the outer enclosure of the unit sensor further comprises at least one tightening ring encircling the inner enclosure, wherein each sensing device of the at least one sensing device is connected to a tightening ring of the at least one tightening ring.

30. The sensor system of claim 29, wherein the at least one tightening ring is laminated on the outer surface of the first elastic layer.

31. The sensor system of claim 29, wherein the at least one tightening ring is made of a material selected from the group consisting of: aluminum, titanium, and carbon fiber.

32. The sensor system of claim 29, wherein:
the at least one tightening ring comprises a plurality of unit strands connected to each other through one or more flexible mechanical joints.

33. The sensor system of claim 1, wherein the first elastic layer is made of a material selected from the group consisting of: BoPET (Biaxially-oriented polyethylene terephthalate), highly conductive and elastic conductors made from silver nanoscale wires (nanowires), kapton, ETFE (ethylene tetra fluoro ethylene) or kevlar in combination with carbon nanotubes.

34. The sensor system of claim 1, wherein a plurality of electronics circuitries are printed on an outer surface of the first elastic layer.

35. The sensor system of claim 1, wherein the inner enclosure comprises at least one diffuser capsule.

36. The sensor system of claim 35, wherein the at least one diffuser capsule carries liquid or solid nitrogen inside a chamber.

37. The sensor system of claim 1, wherein the network of sensors is configured to virtually divide an area of interest in a grid comprising a plurality of sub-regions.

38. The sensor system of claim 37, wherein the network of sensors is configured to allocate a priority rank to each sub-region, based on importance of each said sub-region.

39. The sensor system of claim 38, wherein priority rank allocation occurs in real time.

40. The sensor system of claim 39, where the network of sensors is configured to change the priority rank of each said sub-region based on importance of each said sub-region in real time.

41. The sensor system of claim 38, wherein the unit sensors of the plurality of unit sensors are uniformly distributed in a sub-region in terms of number of the unit sensors and available resources.

42. The sensor system of claim 41, wherein the number of the unit sensors of the network of sensors is increased in a sub-region having a higher priority ranking based on a decision of the network of sensors.

43. The sensor system of claim 41, wherein the number of the unit sensors of the network of sensors is decreased in a sub-region having a lower priority ranking based on a decision of the network of sensors.

44. The sensor system of claim 41, wherein the available resources of each said unit sensor are selected from the group consisting of: available memory, available power, and available bandwidth.

45. The sensor system of claim 41, wherein the plurality of uniformly distributed unit sensors in a first sub-region is configured to decide whether to allow or decline a unit sensor in the first sub-region permission to leave the first sub-region or allow or decline a unit sensor of a second sub-region to enter the first sub-region.

46. The sensor system of claim 45, wherein the second sub-region is a neighboring sub-region of the first sub-region.

47. The sensor system of claim 41, wherein the network of sensors is configured to command each unit sensor of the plurality of unit sensors in a sub-region to leave the sub-region.

48. The sensor system of claim 41, wherein the network of sensors is configured to command each unit sensor of the plurality of unit sensors in a sub-region to enter a neighboring sub-region.

49. The sensor system of claim 1, wherein the inner enclosure comprises at least one protective spoke.

50. A method of using the sensor system of claim 1, the method comprising:
inflating one or more of the unit sensors, said inflating comprising:
releasing isoyanates and polyols between an outer surface of the first elastic layer of the unit sensor and the inner surface of the outer enclosure of the unit sensor by breaking at least one pair of canisters, said least one pair of canisters being attached to one or more tubular rings encircling the inner enclosure of the unit sensor;

releasing an inert gas inside the inner enclosure by breaking at least one diffuser capsule in the inner enclosure;

inflating the inner enclosure with the inert gas; and expanding at least one tightening ring, the at least one tightening ring being laminated on the outer surface of the first elastic layer.

51. A method of using the sensor system of claim 1 for cleaning oil spillage in sea or water, the method comprising:

deploying the plurality of unit sensors into an area of sea or water with oil spillage;

releasing polyurethane foam between an outer surface of the first elastic layer and the inner surface of the outer enclosure of one or more unit sensors of the plurality of unit sensors by breaking at least one pair of canisters, wherein the at least one pair of canisters is attached to one or more tubular rings encircling the inner enclosure;

soaking the polyurethane foam with bioremediation bacteria or chemical dispersants by breaking the one or more tubular rings; and breaking down the oil in water to droplets by making contact with the polyurethane foam soaked with the bioremediation bacteria or the chemical dispersants.

52. A method of using the sensor system of claim 1 in maritime communication, the method comprising:

deploying the plurality of unit sensors in an area of interest at sea; and adopting radiofrequency (RF) signaling by said unit sensors to communicate with each other and with submarines, ships, aircraft or satellite in the area of interest.

53. The method of claim 52, wherein each unit sensor is configured to be located underwater through shape change.

54. A method of using the sensor system of claim 1 for spreading chemicals or other desired materials on flat agricultural lands, the method comprising:

deploying the plurality of unit sensors into an area of interest;

releasing polyurethane foam between an outer surface of the first elastic layer and the inner surface of the outer enclosure of one or more unit sensors of the plurality of unit sensors by breaking at least one pair of canisters, wherein the at least one pair of canisters are attached to one or more tubular rings encircling the inner enclosure;

soaking the polyurethane foam with chemicals or other desired materials by breaking the one or more tubular rings; and spreading the chemicals or other desired materials on land by making contact with the polyurethane foam soaked with the chemicals or other desired materials.

* * * * *